United States Patent [19]
Keefer

[11] Patent Number: 5,096,469
[45] Date of Patent: Mar. 17, 1992

[54] ADSORPTIVE GAS SEPARATOR WITH INERTIAL ENERGY EXCHANGE

[76] Inventor: Bowie G. Keefer, 4324 West 11th Ave., Vancouver, British Columbia, Canada, V6R 2M1

[21] Appl. No.: 611,495

[22] Filed: Nov. 13, 1990

Related U.S. Application Data

[63] Continuation-in-part of Ser. No. 557,132, Jul. 23, 1990.

[51] Int. Cl.⁵ .............................................. B01D 53/04
[52] U.S. Cl. ............................................ 55/25; 55/58; 55/28; 55/62; 55/68; 55/74; 55/75; 55/179; 55/387; 55/389
[58] Field of Search ............... 55/25, 26, 28, 58, 62, 55/68, 74, 75, 161–163, 179, 180, 208, 387, 389

[56] References Cited

U.S. PATENT DOCUMENTS

| | | | |
|---|---|---|---|
| 3,121,625 | 2/1964 | Broughton | 55/58 |
| 3,164,454 | 1/1965 | Wilson | 55/58 X |
| 4,354,859 | 10/1982 | Keller, II et al. | 55/25 |
| 4,702,903 | 10/1987 | Keefer | 55/28 X |
| 4,758,252 | 7/1988 | Lerner et al. | 55/25 |
| 4,801,308 | 1/1989 | Keefer | 55/25 |
| 4,816,121 | 3/1989 | Keefer | 55/68 X |
| 4,954,146 | 9/1990 | Garrett et al. | 55/25 |
| 4,968,329 | 11/1990 | Keefer | 55/25 |

*Primary Examiner*—Robert Spitzer

[57] ABSTRACT

Pressure swing adsorption separation of a gas mixture is performed in first and second working spaces, with each working space having a flow path contacting adsorbent beds and variable displacement chambers. The volumes of the first and second working spaces are cyclically varied in opposite phase by oscillations of a liquid column whose movements change the volume of variable displacement chambers, so as to achieve cyclic pressure changes in each working space as required for the pressure swing process, while the inertia of the oscillating liquid column exchanges energy between the first and second working spaces.

42 Claims, 9 Drawing Sheets

1

ADSORPTIVE GAS SEPARATOR WITH INERTIAL ENERGY EXCHANGE

This is a continuation-in-part of application Ser. No. 07/557,132, filed on Jul. 23, 1990.

TECHNICAL FIELD

The invention relates to separations conducted by pressure swing adsorption.

BACKGROUND ART

Gas separation by pressure swing adsorption is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed, and is reduced during intervals of flow in the reverse direction. As the cycle is repeated, the less readily adsorbed component is concentrated in the first direction, while the more readily adsorbed component is concentrated in the reverse direction.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. This conventional pressure swing adsorption process also makes inefficient use of applied energy, because of irreversible expansion over the valves while switching the adsorbent beds between higher and lower pressures.

The prior art also includes the following pressure swing adsorption devices with cyclically operated volume displacement means reciprocating at the same frequency at both ends of an adsorbent bed, to generate pressure changes internally and thus improve energy efficiency.

Keller (U.S. Pat. No. 4,354,859) has disclosed a single bed pressure swing adsorption device for purifying both components of a binary gas mixture fed to a central point of the adsorbent bed. This device has volume displacement means which may be pistons or diaphragms, of specified unequal displacement at opposite ends of the bed.

My U.S. Pat. No. 4,702,903 discloses use of modified Stirling cycle machines for performing gas separations, in which a temperature gradient is imposed on the adsorbent bed which also serves as a thermal regenerator, so that heat may be applied directly through the modified Stirling cycle as an energy source to perform pressure swing adsorption gas separations.

My U.S. Pat. Nos. 4,801,308 and 4,968,329 disclose valve logic means to provide large exchanges of fresh feed gas for depleted feed gas. Such large feed exchanges, or effective scavenging, may be required when concentrating one component as a desired product without excessively concentrating or accumulating other components, as in concentrating oxygen from feed air containing water vapour whose excessive concentration and accumulation would deactivate the adsorbent.

My U.S. Pat. No. 4,816,121, which is concerned with separation of chemically reactive gases and vapours, describes an embodiment in which a product or the reaction is condensed as a liquid within the apparatus, and this liquid fills a U tube interconnecting two identical gas phase working spaces. A hydraulic energy conversion means, such as a reversible pump-turbine, controls oscillating flow of liquid in the U tube, associated with cyclic volume changes and pressure changes in the two working spaces, in opposite phase.

DISCLOSURE OF INVENTION

Small scale gas separation devices, based on my above cited U.S. patents and U.S. patent application 07/557,132, have been built and operated successfully, for applications including air separation and hydrogen purification. These devices all use mechanical pistons to generate the necessary reciprocating internal volume displacements, in a flow-regulated pressure swing adsorption cycle operating at relatively high frequency. Although adsorbent inventories are greatly reduced compared to most conventional pressure swing adsorption systems, the piston swept volume must considerably exceed the volume of the adsorbent bed in order to generate the desired pressure ratio between minimum and maximum working pressures. In order to achieve the desired functions and energy efficiency, the piston drive mechanism must be adapted to exchange compression energy between adsorbent columns undergoing compression and expansion steps. With the cycle speeds permitted by commercial adsorbent pellets in packed beds (typically not exceeding a practicable limit of 50 RPM indicated by theoretical analysis and test experience), scale-up of such devices using pistons to larger scale tonnage air separation or hydrogen purification applications would be difficult owing to the large and heavily loaded low-speed reciprocating drive mechanisms which would be necessary.

The present invention circumvents the difficulties and costs of scaling up low-speed reciprocating machinery, by using oscillating liquid columns to exchange compression potential energy between adsorption working spaces (or between an adsorption working space and an external potential energy storage device such as a gas spring) undergoing expansion and compression steps of pressure swing cycles, while using the fluid mass of the liquid columns to store kinetic energy in resonance with the potential energy. Thus, one adsorption working space undergoing expansion expends its potential energy of compression to accelerate a liquid column, whose kinetic energy is then exchanged back to potential energy. The apparatus of the present invention oscillates at its resonant natural frequency, so that the amount of potential energy stored when the adsorption working pressure is maximized or minimized will be substantially equal to the amount of kinetic energy stored in the liquid column moving at its highest velocity. Thus the amount of enternally supplied power, required to overcome energy dissipation effects and to compensate residual imbalances of energy storage, will be minimized.

Unlike the above mentioned prior art and related inventions, the present invention provides the means to use oscillating liquid columns to generate all of the volume displacements required to achieve the pressure swings and the coordinated cyclically reversing gas flow over the adsorbent beds, while in preferred embodiments completely eliminating all mechanical moving parts other than valves, the oscillating liquid itself, and sealing elements such as diaphragms.

The invention further provides diaphragm or other isolation means to prevent direct contact between the liquid column and the gas mixture undergoing separation, where such contact may lead to adsorbent deactivation by vapour from the liquid.

Since the oscillating liquid column stores kinetic energy in balance with the potential energy of compression, highly efficient energy recovery is achieved between adsorbent beds undergoing expansion and compression steps, particularly in larger scale systems where fluid flow friction dissipation of the oscillating liquid column can be minimized. Also, the oscillating liquid columns change the working pressure within the adsorbent beds so that valves may be opened to external pressure sources and sinks with the pressure across the valve already equalized to minimize valve operating stresses and wear, thus avoiding a major problem of conventional pressure swing adsorption processes where directional valves must open across large unbalanced pressure differences.

The input power required to overcome energy dissipation losses can be preferably provided either by supplying the feed gas at an elevated pressure relative to the delivery pressure of a product or exhaust gas, or by supplying low grade heat to maintain a temperature gradient in the gas working space so that the apparatus is directly powered in part by the Stirling heat engine cycle. Power may also be injecting by pumping the oscillating liquid columns directly with reversible liquid pumps.

Furthermore, the complete or substantial avoidance of high power reciprocating or pumping machinery, the comparatively small adsorbent inventory, and the relatively simplified valve logic of the present invention will enable highly favourable capital costs, particularly in larger scale tonnage applications.

The process of the invention may be described as a process for separating first and second components of a gas mixture, the first component being more readily adsorbed under increase of pressure relative to the second component which is less readily adsorbed under increase of pressure over an adsorbent, such that a gas mixture of the first and second components contacting the adsorbent is relatively enriched in the first component at a first lower pressure and is relatively enriched in the second component at a second higher pressure when the pressure is cycled between the first and second pressures at a cyclic frequency; providing for the process a flow path through an adsorbent bed in a working space; and the process having the cyclically repeated steps at the cyclic frequency and in some sequence of:

(a) introducing the gas mixture to the flow path,
(b) generating cyclically oscillating flow of a displacement liquid to change the volume of the working space, thus changing the pressure of the working space and also changing the amount of potential energy associated with gas compression and adsorption in the working space,
(c) generating cyclically reversing flow of the gas mixture in the flow path,
(d) coordinating the relative phase of the changes in pressure within the working space and the reversing flow of the gas mixture in the flow path, so that the gas flow in the flow path is directed toward a first end of the flow path when the pressure is approximately the first lower pressure, and the gas flow in the flow path is oppositely directed toward a second end of the flow path when the pressure is approximately the second higher pressure; so as to achieve a separation of gas enriched in the first component to the first end of the flow path, and gas enriched in the second component to the second end of the flow path,
(e) withdrawing a product from the flow path,
(f) storing potential energy of compression in the working space when the pressure in the working space is the higher second pressure,
(g) storing potential energy when the pressure in the working space is the lower first pressure,
(h) storing kinetic energy when the pressure in the working space is changing between the first and second pressures,
(i) exchanging energy between the potential energy stored in step (f), the kinetic energy stored in step (h), and the potential energy stored in step (g), and
(j) providing driving energy to the process to compensate for energy dissipation effects and any imbalance of energy storage in steps (f), (g) and (h), and further providing that the potential energy stored in steps (f) and (g) and the kinetic energy stored in step (h) are approximately equal, to within the energy dissipation effects and energy storage imbalances compensated in step (j). Thus, the cyclic frequency is approximately a resonant frequency.

The invention provides an apparatus for separating first and second components of a gas mixture, the first component being more readily adsorbed under increase of pressure relative to the second component which is less readily adsorbed under increase of pressure over an adsorbent, such that a gas mixture of the first and second components contacting the adsorbent is relatively enriched in the first component at a first lower pressure and is relatively enriched in the second component at a second higher pressure when the pressure is cycled between the first and second pressures at a cyclic frequency; and the apparatus including a working space containing an adsorbent bed, with a flow path through the adsorbent bed having first and second ends, and means to introduce the gas mixture and means to remove a product from the flow path; the working space further including a first volume displacement chamber communicating with the first end of the flow path, and a second volume displacement chamber communicating with the second end of the flow path, so that changes of the total volume of the working space including the first and second volume displacement chambers will change the pressure in the working space between the first and second pressures and thus will change the compression potential energy in the working space; the apparatus further including:

(a) a liquid column in a pipe, the liquid column having two ends,
(b) means to couple one end of the liquid column to the working space, so that displacement of the liquid column in the pipe is coupled to volume changes of the working space and changes of pressure and compression potential energy in the working space,
(c) second potential energy storage means coupled to the other end of the liquid column, so that potential energy is stored in the second potential energy storage means when the pressure in the working space is the first lower pressure,
(d) means to generate oscillating displacements of the liquid column at the cyclic frequency,
(e) means to generate cyclic volume changes of the first and second volume displacement chambers, with the volume changes in the first volume displacement chamber having a lagging phase with respect to volume changes in the second volume displacement chamber; so as to generate flow of the gas mixture in the flow path, in a relative phase to changes in pressure within the working space so that the gas flow in the flow path is directed toward a first end of the flow path when the pressure is approximately the first lower pressure, and the gas flow in the flow path is oppositely directed toward a second end of the flow path when the pressure is approximately the second higher pressure; so as to achieve a separation of gas enriched in the first component toward the first end of the flow path, and gas enriched in the second component toward the second end of the flow path, (f) means to store kinetic energy substantially in the fluid mass of the liquid column when the pressure in the working space is changing between the first and second pressures, (g) means to exchange energy between the potential energy stored in the working space when its pressure is the second pressure, potential energy stored in the second potential energy means when the pressure in the working space is the first lower pressure, and the kinetic energy stored when the pressure is changing between the first and second pressures, and (h) means to provide driving energy to the process to compensate for energy dissipation effects and any imbalance of energy stored as potential and kinetic energy.

The means to couple one end of the liquid column to the working space may be a flexible diaphragm separating the liquid from gas n a volume displacement chamber, or a piston float within a cylinder, that may be mutually sealed by an internally pressurized double diaphragm. In some applications, the free surface of the liquid may be in direct contact with the gas in the second volume displacement chamber.

The second potential energy storage means may be another working space similar to the working space but operated in opposite phase, or may be a gas charged chamber communicating to the pipe at the other end of the liquid column from the working space. The second potential energy storage means may be a vertical portion of the liquid column at its other end opposite from the working space, this vertical portion having a smaller cross sectional area in the horizontal plane than the end of the liquid column at the working space, so that gravitational potential energy is stored by changes in the center of mass elevation of the liquid column.

The liquid column may be a primary liquid column coupled to the second volume displacement chamber; and the means to coordinate cyclic volume changes of the first and second volume displacement chambers, with the volume changes in the first volume displacement chamber having a lagging phase with respect to volume changes in the second volume displacement chamber, is provided as a secondary liquid column coupled at opposite ends to the first and second volume displacement chamber, with the said lagging phase established by the fluid inertia of said secondary liquid column.

The primary liquid column may be coupled to the first volume displacement chamber; and the means to coordinate cyclic volume changes of the first and second volume displacement chambers, with the volume changes in the first volume displacement chamber having a lagging phase with respect to volume changes in the second volume displacement chamber, is provided as a displacer piston means to generate opposite volume displacements in the second volume displacement chamber and in a displacer chamber communicating to the first volume displacement chamber, with displacer drive means to reciprocate the displacer piston at the cyclic frequency.

The apparatus may include flow control means to control oscillating flow of liquid in the liquid column, such as a reversible pump or a throttle valve. The apparatus may alternatively have a shut-off valve in the primarily liquid column pipe, with control means to close the valve so as to stop flow in the pipe during intervals while the pressure in the working space is the first pressure and while the pressure in the working space is the second pressure, so as to hold the stored potential energy during such intervals and thus to extend the cycle period beyond the resonant period of the liquid column in the apparatus, and to open the valve to release the stored potential energy for exchange with kinetic energy of the liquid column while the pressure is changing between the first and second pressures.

The apparatus may have multiple working spaces and liquid columns interconnected for exchange of kinetic and potential energy, and or smooth operation. Thus, an apparatus may have three working spaces and three liquid columns, each liquid column with a first end coupled to the first volume displacement chamber of a working space and a second end coupled to the second volume displacement chamber of another working space, and with valve control means to control the opening of a feed supply valve and a product delivery valve for each working space, such that the operating phase of the working spaces is 120° apart.

In each gas phase working space, a device according to the present invention has a flow path through one adsorbent bed or through a plurality of interconnected adsorbent beds within the working space. The flow paths have two ends, or may be branched to have three or more ends. A number of cyclic volume displacement chambers are provided in each working space to generate cyclic pressure variations and coordinated flow reversals in the corresponding flow path, through oscillations of the volume of each chamber. The cyclic volume displacement chambers are connected to an end of the flow path or to a node in the flow path at the interconnection between adjacent adsorbent beds.

The volume displacement chambers in each working space all oscillate in volume at the same frequency, but with a phase difference between at least two volume displacement chambers at opposite ends of the flow path.

The feed gas mixture is introduced by feed supply means to an intermediate node in the flow path, and product streams concentrated in either of the respectively more readily and less readily adsorbed fractions are withdrawn by product delivery means connected to the opposite ends of the flow path. The more readily adsorbed or heavy component is concentrated in the heavy product withdrawn adjacent the compression space, and the less readily adsorbed or light component is concentrated in the light product withdrawn adjacent the expansion space.

Product delivery valves and valve control means are incorporated in the product delivery means, to control the mass flow rates of the heavy and light products so that desired high purity and recovery of the heavy and light components in respectively the heavy and light products is achieved.

A first component which is either more or less readily adsorbed than the second and third components is introduced to the flow path at a point between the first end of the flow path to which the first product is concentrated, and the intermediate node from which the second and third flow paths branch and past which only the second and third components are allowed to pass for subsequent separation between the second and third flow path ends.

This invention provides for energy balance between pairs of gas separators operating in opposed phase. A balance is achieved between potential and kinetic energy storage by operating near the resonant natural frequency of the apparatus. When two opposed working spaced are used, both working spaces together store potential energy which is maximum when their pressures are oppositely extremized, and minimum when their pressures are equal. Kinetic energy associated with velocity of the primary liquid column will be approximately maximum when the pressures are equal, and minimum when the pressures are oppositely extremized. Inertia contributing to kinetic energy storage may be increased by using relatively long and small diameter liquid column pipes. Hence, the apparatus will have a resonant frequency at which energy storage is nearly constant.

Over complete cycles, power will be generated by the second volume displacement chamber, and power will be absorbed by the first column displacement chamber. If a temperature gradient is maintained in the flow path such that its second end is hotter than the first end, excess power will be generated by the second piston according to the Stirling thermodynamic cycle, and the apparatus may then be powered thermally at least in part.

MODES FOR CARRYING OUT THE INVENTION

FIG. 1

Figure 1:
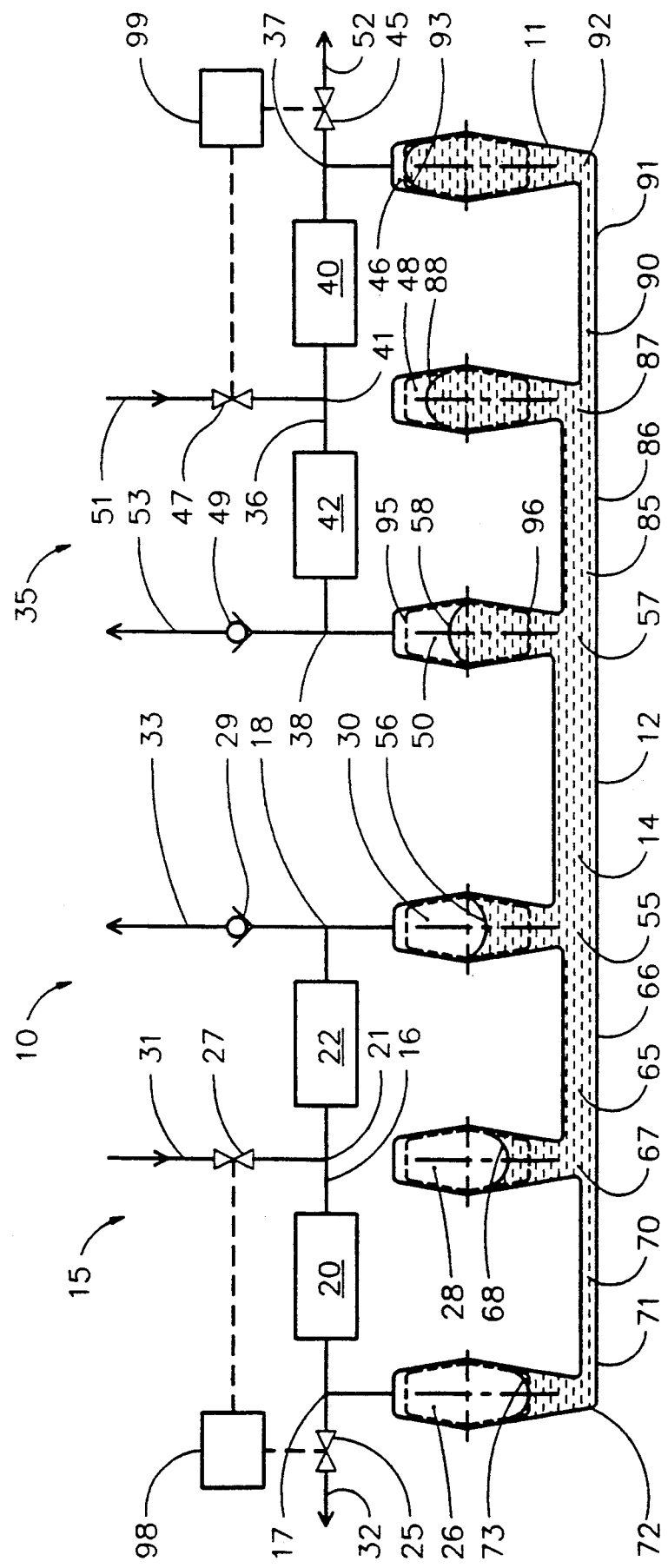
FIG. 1 is a simplified schematic of an apparatus with two adsorbent beds and three volume displacement chambers in each of two working spaces, coupled by an oscillating liquid column.

A pressure swing adsorption apparatus 10 has a pressure housing 11, which includes a pipe 12 containing a liquid column 14. Pressure housing 11 also contains a first gas working space 15, with a flow path 16 having a first end 17 and a second end 18. Flow path 16 extends from first end 17 through a first adsorbent bed 20 to an intermediate node 21, and thence through a second adsorbent bed 22 to second end 18. First end 17 of the flow path communicates to a first product delivery valve 25, and to a first volume displacement chamber 26. Intermediate node 21 of the flow path communicates to a feed supply valve 27 and to an intermediate volume displacement chamber 28. Second end 18 of the flow path communicates with a second product delivery valve 29, here shown as a non-return valve, and with a second volume displacement chamber 30. Feed supply valve 27 communicates to feed conduit 31, and the first and second product delivery valves 25 and 29 communicate to product delivery conduits 32 and 33 respectively.

Pressure housing 11 also includes a second gas working space 35, identical to the first gas working space 15, with a flow path 36 having a first end 37 and a second end 38. Flow path 36 extends from first end 37 through a first adsorbent bed 40 to an intermediate node 41 of the flow path, and thence through adsorbent bed 42 to second end 38. First end 37 of the flow path 36 communicates to a first product delivery valve 45, and to a first volume displacement chamber 46. Intermediate node 41 of the flow path 36 communicates to a feed supply valve 47, and to an intermediate volume displacement chamber 48. Second end 38 of the flow path 36 communicates to a second product delivery valve 49, here shown as a non-return valve, and to a second volume displacement chamber 50. Feed supply valve 47 communicates to feed conduit 51, and the first and second product delivery valves 45 and 49 communicate to product delivery conduits 52 and 53 respectively.

Each volume displacement chamber is coupled by a diaphragm to one end of an oscillating liquid column. The diaphragm serves as isolation means to prevent direct contact of the liquid with the gas in a gas working space, and to keep liquid out of the adsorbent beds, while transmitting displacements of the liquid into equal gas volume displacements in the volume displacement chambers without substantial resistance. The diaphragms may be flexing or rolling elastomeric diaphragms or bladders.

Thus, liquid column 14 in pipe 12 has a first end 55 coupled by diaphragm 56 to the second volume displacement chamber 30 of the first working space 15, and a second end 57 coupled by diaphragm 58 to the second volume displacement chamber 50 of the second working space 35. Since liquid column 14 couples the first and second working spaces, it will be referred to as the primary liquid column. It is evident that flow in pipe 12 will result in equal and opposite volume changes, and opposite pressure changes, in the first working space 15 and the second working space 35.

Each working space 15 and 35 operating under similar conditions appears as a gas spring of equal stiffness and coupled oppositely to primary liquid column 14. Potential energy (including energy of compression and adsorption) of the combined apparatus is maximized when the working pressures of the two working spaces are oppositely extremized, when the movement of liquid in pipe 12 has reached an extreme position leftward or rightward. Potential energy of the apparatus is minimized when working pressures of the two working spaces are equal and the liquid in pipe 12 is at a center position.

When the potential energy of the combined apparatus is maximized, liquid flow in pipe 12 is approximately zero. When the potential energy of the apparatus is minimized, the liquid flow velocity in pipe 12 will be substantially maximized. Kinetic energy associated with the liquid flow in the primary liquid column 14 in pipe 12 is thus maximized as the potential energy is minimized, while that kinetic energy becomes zero as the potential energy is maximized. Thus, the changes in kinetic energy tend to cancel the changes in potential energy. Ideally, the total energy associated with operation of the apparatus, comprising the sum of potential and kinetic energy contributions, will be maintained nearly constant through cancellation of potential and kinetic energy variations, thus achieving balance between energy stored alternatingly in kinetic and potential energy forms. When the amplitude of variations in kinetic and potential energy are equal, the apparatus is operating at its natural resonant frequency.

The kinetic energy associated with liquid flow is the sum of the kinetic energies of all moving liquid particles, i.e. the mass of the particle times the square of its velocity and divided by 2. Thus, relatively small volumes of liquid moving at high velocity can make a large contribution to kinetic energy. Hence, smaller diameters and longer length of pipe 12, commensurate with good hydraulic design to avoid large flow friction losses, will enhance the kinetic energy storage capacity. Use of higher density liquid and operation at higher cycle frequency will also enhance kinetic energy storage within a compact overall volume.

Secondary liquid columns are provided in the embodiment of FIG. 1, to provide inertial coupling from the primary liquid column to the first and intermediate volume displacement chambers. Thus, a secondary liquid column 65 in pipe 66 communicates with the first end 55 of the primary liquid column 15, and extends to junction 67 coupled by diaphragm 68 to intermediate chamber 28. Another secondary liquid column 70 in pipe 71 extends from junction 67 (or first end 55) to liquid column end 72, coupled by diaphragm 73 to volume displacement chamber 26.

Similarly, a secondary liquid column 85 in pipe 86 communicates with the second end 57 of the primary liquid column 14, and extends to junction 87 coupled by diaphragm 88 to intermediate chamber 48. Another secondary liquid column 90 in pipe 91 extends from junction 87 (or second end 57) to liquid column end 92, coupled by diaphragm 93 to volume displacement chamber 46.

As shown by dashed upper position 95 and dashed lower position 96 for diaphragm 58 changing the volume of a typical volume displacement chamber 50, the maximum amplitude of volume changes in each volume displacement chamber is defined by the allowable deflection of the diaphragms within the chambers. As the liquid rises and falls below the diaphragm, the volume displacement chamber above the diaphragm respectively contracts and expands.

It will be noted that the diaphragms in FIG. 1 are shown in positions that correspond to one position of a liquid standing wave in the interconnected liquid columns. Oscillations of the primary liquid column provide opposite changes of total gas volume in the two working spaces, while oscillations of the secondary liquid columns provide phase shifts between the volume displacement chambers in one working space. Thus, oscillations of the primary liquid column provides means to change the volume and thus to change the working pressure in a working space, while exchanging potential energy of compression in the working spaces with kinetic energy of flowing liquid in the primary liquid column. The working pressure in each working space will cycle between lower and upper limits, defined as a first lower pressure and a second higher pressure. The volume of the working space has been maximized by expansion of its volume displacement chambers (by falling liquid level under the diaphragms) when the pressure drops to the first pressure, and has been minimized by contraction of its volume displacement chambers (by rising liquid level under the diaphragms) when the pressure rises to the second pressure.

Oscillations of the secondary liquid columns provides means to generate cyclic reversing flow of gas in the flow path, without changing the volume of a gas working space. Coordination of the liquid oscillations in the primary and secondary liquid columns will provide coordination of the relative phase of the changes of pressure and the reversing flow of the gas mixture in the flow path. Since the gas pressure in the volume displacement chambers of a working space is identical at each instant, except for gas flow friction pressure drops in the adsorbent beds, the inertia of the secondary liquid columns will cause the volume displacements in the intermediate volume displacement chamber 28 and (even more) the first volume displacement chamber 26 to have a lagging phase with respect to volume changes in the second volume displacement chamber 30 of a working space 15.

For the system to oscillate at its natural or resonant frequency, the kinetic energy of the primary liquid column at its maximum velocity will be equal to the total compression potential energy of the working spaces, plus gravitational potential energy associated with liquid level differences between the working spaces, when liquid column is stopped and the pressures in the working spaces are extremized at the first and second pressures. The cyclic frequency of the process will conform closely to the resonant frequency of the primary liquid column in the apparatus, and may be close to the free natural frequency of the secondary liquid columns, whose free natural frequency is defined by the kinetic energy of a secondary liquid column at maximum velocity being equal to the gravitational potential energy associated with maximum liquid level differences between its ends.

Consequently, the gas flow in the flow path 16 will be directed toward the first end 17 when the pressure is the first lower pressure, since then the first chamber 26 is still expanding while the second chamber 30 has expanded fully and is contracting. When the pressure is the second higher pressure, the gas flow in flow path 16 will be directed toward the second end 18, since then the first chamber 26 is still contracting while the second chamber 30 has contracted fully and is expanding.

With a gas mixture of first and second components, the first component being more readily adsorbed under increase of pressure relative to the second component which is less readily adsorbed under increase of pressure, contacting the adsorbent along the flow path, the gas flow directed toward the second end 18 of the flow path when the pressure is the second pressure will be enriched in the second component, since the first component is then taken up preferentially by the adsorbent at the higher pressure. When the pressure is the first pressure, the gas flow directed toward the first end 17 of the flow path will be enriched in the first component which is desorbed at the lower pressure. Consequently, over each cycle, the first component is concentrated toward the first end 17 of the flow path, and the second component is concentrated toward the second end 18 of the flow path.

With the primary liquid column 14 oscillating back and forth with a suitable amplitude to generate cyclic variations of the total volume of each working space, the pressure in each working space will cycle between the first pressure and the second pressure. When the working pressure in working space 15 reaches approximately the second pressure, its feed supply valve 27 is opened by valve control means 98 for a time interval, during which the feed gas mixture supplied at approximately the second pressure enters the working space and maintains the working pressure substantially at the second pressure while the feed supply valve remains open. Also while the working pressure is substantially the second pressure, second product delivery valve 29 opens to deliver some first product gas into delivery conduit 33.

After feed supply valve 27 is closed by control means 98, the working pressure in working space 15 drops to the first pressure because of the expansion of its volume displacement chambers. When the working pressure reaches approximately the first pressure, valve control means 98 opens first product delivery valve 25 for an interval during which the first product is delivered through conduit 32, and the working pressure is maintained at approximately the first pressure. Then control means 98 closes valve 25, and the working pressure rises to the second pressure as the working volume is contracted by the volume displacement chambers.

An identical cycle, but 180° out of phase will be conducted in the second working space 35. When the working pressure there is the second pressure, feed will be introduced through feed supply valve 47, and second product will be withdrawn through second product delivery valve 49. When the working pressure is the first pressure, first product will be withdrawn through first product delivery valve 45. The opening and closing of feed supply valve 47 and first product delivery valve 45 are timed by valve control means 99.

For the above cycle to operate as described, the internal pressure of the feed conduits 31 and 51 will be maintained (for example by an external compressor) at or slightly above approximately the second pressure. The internal pressure of second product delivery conduits 33 and 53 will be externally maintained at or slightly below approximately the second pressure, and the internal pressure of first product delivery conduits 32 and 52 will be externally maintained at approximately the first pressure.

During steady state operation, the amount of first product withdrawn during each cycle is less than the amount of feed introduced, by the amount of second product withdrawn. Since the second pressure is the higher pressure, energy is supplied to the apparatus by the admission of pressurized feed gas less the amount of second product withdrawn at the second pressure, and by the delivery of the amount of first product withdrawn at the first pressure. Thus, the apparatus as described operates as an expansion engine, and the energy thus provided during each cycle excites the oscillation of the liquid columns and overcomes energy losses so that steady oscillation is sustained.

In the embodiment of FIG. 1, energy to drive the apparatus is provided by introducing the feed gas mixture at a relatively higher pressure, and withdrawing a product gas at a relatively lower pressure, thus contributing expansion energy within the working space to overcome energy dissipation effects and any imbalance between kinetic and potential energy stored in the apparatus at alternating moments. The apparatus is controlled by valve control means 98 and 99, adjusting the intervals during which the feed supply valves and first product delivery valves are open. The first and second pressures may also be adjusted. A smaller pressure ratio between the second and first pressures will be appropriate if the feed supply and first product delivery valve open intervals are extended. The resonant natural frequency of oscillation will be reduced if the first and second pressures are both reduced, thus reducing the average working pressure and the amount of potential energy stored in gas compression.

Each working space of the apparatus includes a plurality of volume displacement chambers communicating with the ends of the flow path and with intermediate nodes of the flow path. The volumes of these chambers are cyclically changed at the same cyclic frequency, and coordinated to establish a phase relation between the chambers along the flow path. Thus, the phase of volume changes in intermediate volume displacement chamber 28 is intermediate between that of first volume displacement chamber 26 with a lagging phase, and second volume displacement chamber 30 with a leading phase. As disclosed in my co-pending U.S. patent application 07/557,132, additional adsorbent beds and volume displacement chambers may be incorporated in the flow path, which may be double-ended or may be branched. Thus, for substantially complete separation of a trace first component from the second component carrier gas, the first volume displacement chamber and first adsorbent bed may be much smaller than the second volume displacement chamber and the second adsorbent bed respectively, and further intermediate volume displacement chambers and adsorbent beds may be provided along the flow path.

EXAMPLE NO. 1

A small experimental apparatus using pistons instead of liquid columns, but with the same configuration of adsorbent beds and valve logic as either working space of FIG. 1, was used to purify hydrogen as the desired second product from a feed gas mixture of 74% $H_2$, 24.4% $CO_2$, 1% CO and 0.5% $CH_4$, representing dry methanol reformate. Swept volume of each volume displacement chamber was approximately 200 cc, and the feed gas flow rate was approximately 250 cc/min. Cycle frequency was 10 RPM. Activated charcoal adsorbent was used. By controlling the ratio of first and second product flows, the second product was purified hydrogen of >99.9% purity, with 98.7% recovery of feed hydrogen in the second product.

FIG. 2

Figure 2:
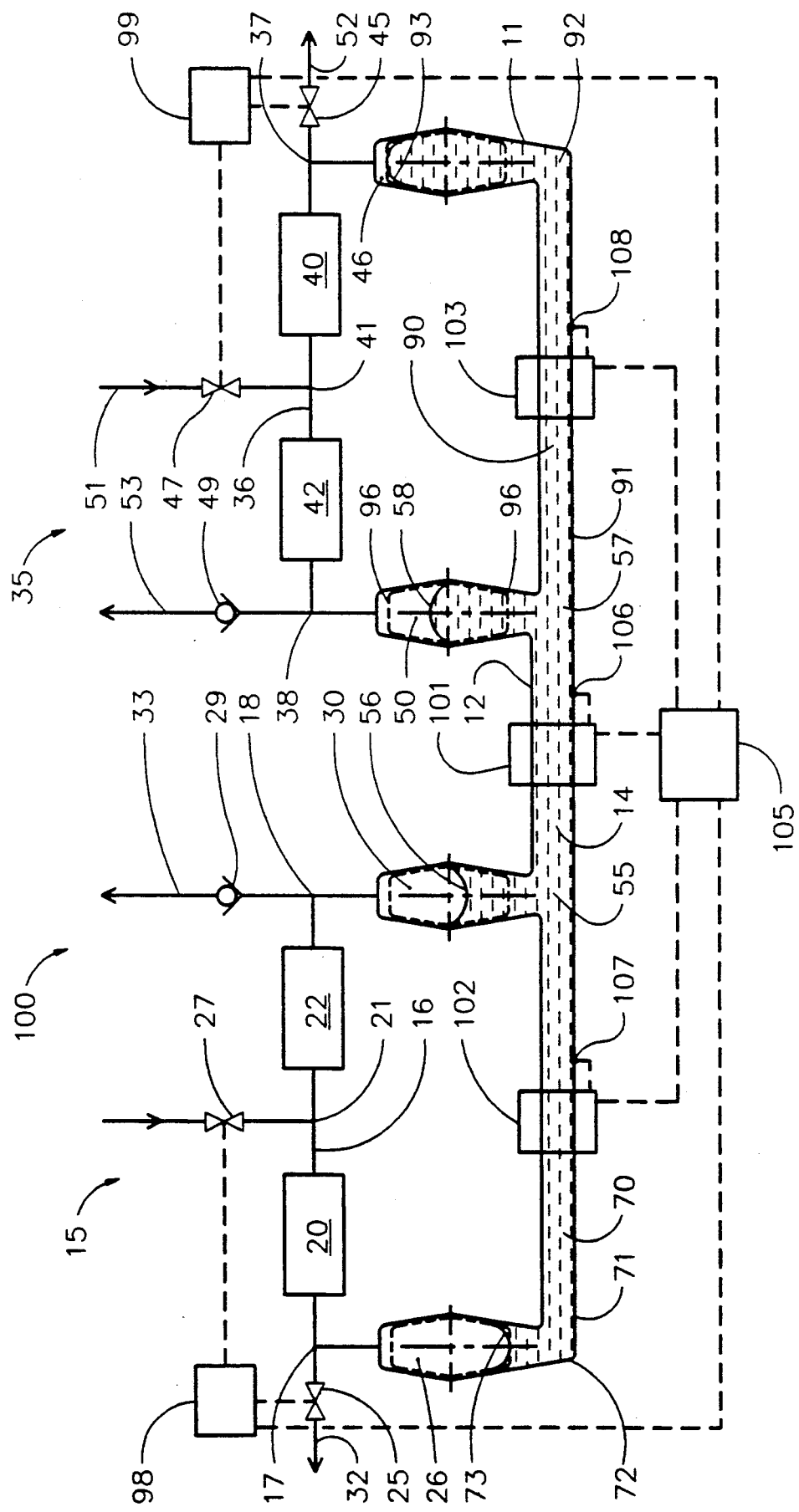
FIG. 2 shows a similar apparatus with two volume displacement chambers in each working space, and flow control means in the liquid columns.

Alternatively to the arrangement of FIG. 1, the intermediate volume displacement chambers may be deleted, as shown in FIG. 2. This somewhat less versatile embodiment 100 is capable of substantially complete separation of binary mixtures with both components present at substantial concentrations in the feed. Component nomenclature and numerals in FIG. 2 follow FIG. 1 exactly, after deletion of intermediate volume displacement chambers 28 and 48, and the integration of secondary liquid columns 65 and 85 with columns 70 and 90 respectively, and pipes 66 and 86 with pipes 71 and 91 respectively.

Referring to the first working space 15 of embodiment 100, the first adsorbent bed 20 could be deleted, so that intermediate node 21 would become identical with the first end 17 of flow path 16. The apparatus would then be suitable for purifying the second (less strongly adsorbed) component of the feed mixture, with incomplete recovery of the second component since the first product would be only partially concentrated in the first component.

Alternatively, the second adsorbent bed 22 could be deleted, so that intermediate node 21 would become identical with the second end 18 of flow path 16. The apparatus would then be suitable for purifying the first (more strongly adsorbed) component of the feed mixture, with incomplete recovery of the first component since the second product would be only partially concentrated in the second component.

FIG. 2 also shows provision for additional control means, so that oscillations of the primary and secondary liquid columns may be controlled more positively. These control means include primary flow control means 101 in the primary liquid column 14, and secondary flow control means 102 and 103 in secondary liquid columns 70 and 90 respectively. The primary and secondary flow control means may be control valves, or alternatively may be flow control pump means. Flow control pumps may be over-center controllable pitch propeller pumps, or fixed pitch reversible controllable speed propellers, as described further in my co-pending U.S. patent application 07/557,132. Flow control means 101, or 102 and 103, provided as pump means may be actively controlled by a feedback controller 105, responding to primary flow sensor 106 and secondary flow sensors 107 and 108. Feedback controller 105 will be programmed to establish and maintain the primary and secondary liquid oscillations within a pre-determined optimal pattern of amplitudes and phases, further coordinated with valve controllers 98 and 99.

While flow control means provided as throttling control valves may be used passively to adjust the oscillation damping coefficient to maintain desired amplitudes, flow control means provided as valves may be used actively. Thus, a primary or secondary flow control means provided as a two-way shut-off valve may be closed at the moment when liquid flow through it stops, held closed for a desired delay interval, and then opened to release the exchange of potential energy for kinetic energy. The potential energy stored in the apparatus is typically maximized when the liquid flow stops, and can be held by closing a valve to stop flow over the delay interval. This approach of interrupting the oscillations extends the cycle period by the amount of the delay intervals, while still allowing the exchange of potential and kinetic energy to enable fullest energy recovery. A longer cycle period may be necessitated by slow adsorption kinetics; and the approach of interrupting oscillations with a liquid flow shut-off valve serving as primary liquid flow control means enables energy exchange, while avoiding use of an excessively long and massive liquid column that would be needed to establish a very long natural resonant period.

FIG. 3

Figure 3:
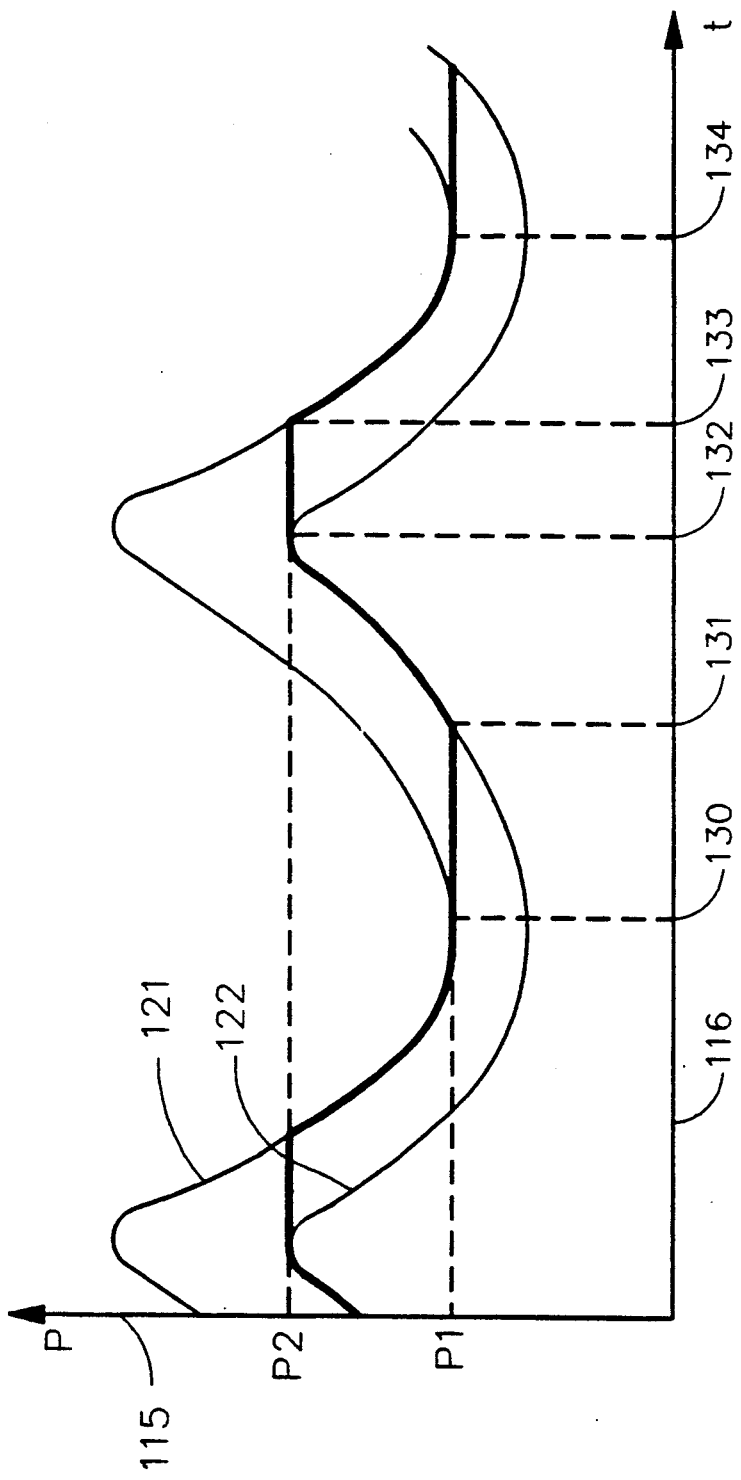
FIG. 3 shows pressure waveforms for a process according to the invention.

In order to clarify the operation of the apparatus, FIG. 3 shows plot of pressure versus time. The vertical axis 115 represents total working pressure within e.g. working space 15 of apparatus 10 of FIG. 1 or 100 of FIG. 2, and the horizontal axis 116 represents time For N moles of gas, at an approximately constant absolute temperature T, within working space 15, and in the approximation of a linear dependence of adsorption uptake on total pressure P, one has the approximation of the ideal gas law, $$PV = NRT,$$

where

V represents the effective gas volume including the free gas volume of the working space plus an allowance for adsorbent uptake. As the free gas volume varies approximately sinusoidally between upper and lower limits as the primary liquid column 14 oscillates, the pressure also varies quasisinusoidally, as shown in FIG. 3 in curve 120 for $N = N_1$ moles of gas in the working space, and in curve 121 for $N = N_2$ moles of gas in the working space, where $N_2 > N_1$.

The process is described, starting with $N_2$ moles of gas in the working space, and with the pressure dropping just before time 130. At time 130, the working space pressure reaches its minimum value at the first pressure $P_1$, and the first product delivery valve 25 is opened by controller 98. Valve 25 stays open during an interval until time 131, and $(N_1 - N_2)$ moles of first product is delivered through valve 25 as the pressure remains substantially equal to $P_1$. At time 131, controller 98 closes the first product delivery valve 25, and the pressure of the $N_1$ moles of gas rises to the maximum value which is the second pressure $P_2$ attained at time 132. At time 132, controller 98 opens the feed supply valve 27, Which is held open during an interval until time 133. During the interval between times 132 and 133, the feed supply means delivers feed gas mixture into the working space, and a portion leaves the working space as second product through the second product delivery valve 29, so that $(N_2 - N_1)$ excess moles are retained in the working space. With $N_2$ moles of gas in the working space, the feed supply valve closes at time 133, and the pressure drops to its minimum value $P_1$ at time 134, which is one cycle period after time 130. The cycle then repeats.

Since there are more moles of gas in the working space during an expansion step from time 133 to time 134, compared to the number of moles during a Compression step from time 131 to time 132, the apparatus is powered by the excess compression energy of its feed supply. Clearly, the valve logic described above could be modified in many ways, within the principle of introducing the feed gas mixture at a relatively higher pressure compared to the pressure at which a product gas is withdrawn.

Figure 4:
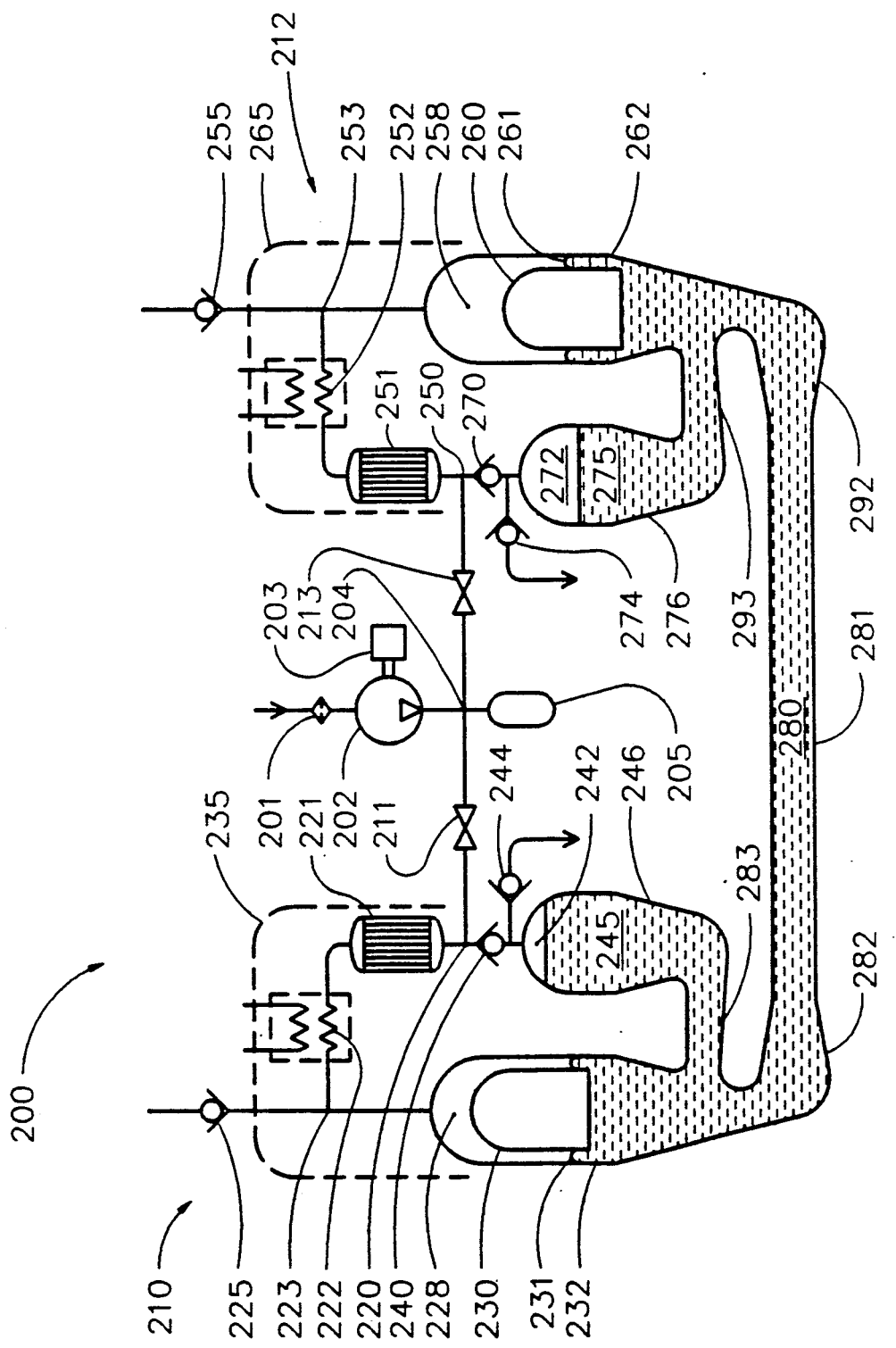
FIG. 4 shows an oxygen concentration apparatus with provision for partial powering by waste heat.
Figure 7:
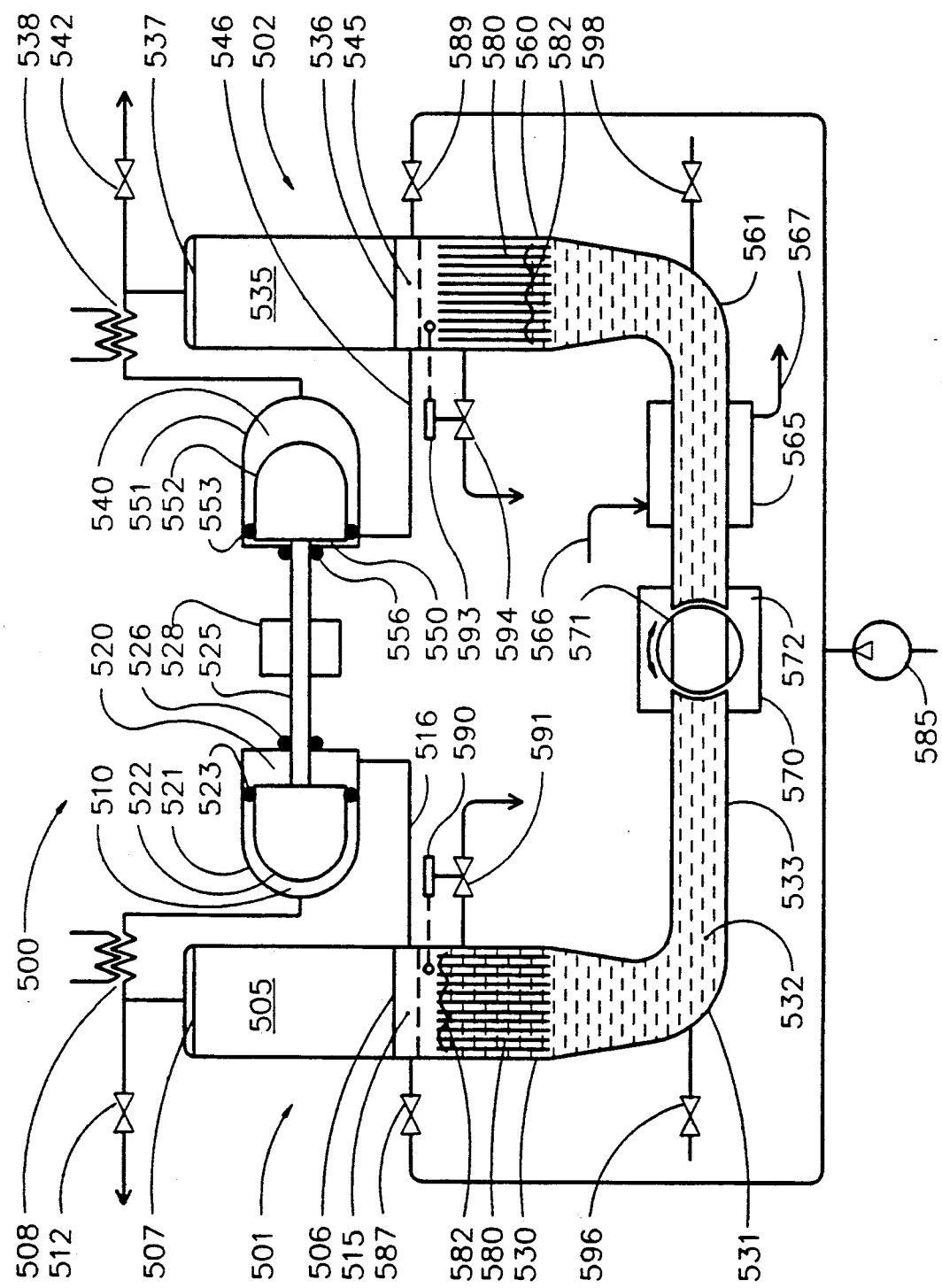
FIG. 7 shows an apparatus with two working spaces and displacer pistons, and with a product component dissolved or condensed into a liquid.

FIG. 3 is also suggestive of another way to power an apparatus of the present invention. If curves 120 and 121 are taken to represent the same number N of moles of gas in the working space, but at different temperatures $T_1$ for curve 120 and $T_2$ for curve 121, where $T_2 > T_1$, we may regard the time interval from time 130 to time 131 as a step during which the average temperature of the gas in the working space is decreased, and the interval from time 132 to time 133 as a step during which the average temperature of the gas in the working space is increased. These steps are obtained if the second end of the flow path and gas within the second volume displacement chamber are maintained at a higher temperature than the first end of the flow path and gas within the first volume displacement chamber, since the gas in the flow path flows toward the hotter second end of the flow path when the pressure is the higher second pressure, and toward the cooler first end of the flow path when the pressure is the lower first pressure. This is the principle of the Stirling cycle, and the ideal expansion energy available from expanding the hotter gas at $T_2$ between time 133 and time 134 exceeds the ideal compression energy required to compress the cooler gas at $T_1$ between time 131 and 132. Hence, thermal energy can be converted by the Stirling cycle to drive the apparatus, as will be further described in the embodiments of FIGS. 4 and 7.

FIG. 4

An oxygen concentration apparatus, with option for supplemental thermal powering by a low grade heat source, is described. Air separation apparatus 200 has an inlet filter 201 filtering feed air to a feed compressor 202 or blower, driven by motor 203. The compressed feed air from feed compressor 202 enters feed manifold 204, with surge chamber 205. The feed manifold may also include a chiller and water condensate trap. Feed manifold 204 is connected to a first working space 210 by first feed supply valve 211, and to a second working space 212 by second feed supply valve 213.

In first working space 210, the feed supply valve 211 communicates to a first end 220 of a flow path through adsorbent bed 221. The flow path passes from its first end 220 through bed 221 and thence through an optional heat exchanger 222 to second end 223 of the flow path. Second end of the flow path 223 communicates to a second product delivery valve 225, and to a second volume displacement chamber 228 whose volume is changed by a floating hollow piston 230, sealed by diaphragm 231 to second cylinder 232. The second end 223 of the flow path, heat exchanger 222, second cylinder 232, and the adjacent end of the adsorbent bed 221 are enclosed in an optional thermal insulation jacket 235. The first end 220 of the flow path is connected by non-return valve 240 to a first volume displacement chamber 242, from which exhaust gas is discharged to ambient by exhaust non-return valve 244. Volume changes in the first volume displacement chamber 242 are achieved by a secondary oscillating water column 245 in displacement vessel 246.

In second working space 212, the feed supply valve 213 communicates to a first end 250 of a flow path through adsorbent bed 251. The flow path passes from its first end 250 through bed 251 and thence through an optional heat exchanger 252 to second end 253 of the flow path. Second end of the flow path 253 communicates to a second product delivery valve 255, and to a second volume displacement chamber 258 whose volume is changed by a floating hollow piston 260, sealed by diaphragm 261 to second cylinder 262. The second end 253 of the flow path, heat exchanger 252, second cylinder 262, and the adjacent end of the adsorbent bed 251 are enclosed in an optional thermal insulation jacket 265. The first end 250 of the flow path is connected by non-return valve 270 to a first volume displacement chamber 272, from which exhaust gas is discharged to ambient by exhaust non-return valve 274. Volume changes in the first volume displacement chamber 272 are achieved by a secondary oscillating water column 275 in displacement vessel 276.

The apparatus 200 has a primary water column 280 oscillating in a pipe 281, whose first end 282 communicates directly to second cylinder 232 and to pipe 283 containing secondary oscillating water column 245. A second end 292 of pipe 281 communicates directly to second cylinder 262 and to pipe 293 containing secondary oscillating water column 275.

Using a molecular sieve adsorbent such as zeolite 10X, the apparatus will deliver concentrated oxygen as the first product. Nitrogen, carbon dioxide and water vapour are concentrated in the second product which is exhausted by exhaust valves 244 and 274. The role of non-return valves 240 and 270 is to ensure positive removal of oxygen-depleted feed gas exiting from the second end of the flow path during each cycle, so that atmospheric humidity will not be excessively concentrated and accumulated at the second end of the flow path; and only fresh feed air is admitted to the adsorbent bed. Since gas in the first volume displacement chambers 242 and 272 cannot reenter the adsorbent bed, but will be exhausted by non-return valves 244 and 274, the free surface of the water can be allowed to contact the gas in chambers 242 and 272 without a separating diaphragm.

If the optional heat exchangers and thermal insulation jackets are omitted, the apparatus is powered by the feed compressor motor 203. If these optional features are included, and the first ends of the flow paths are maintained at a temperature greater than ambient (i.e., of the order of 80° to 120° C.) by heat exchangers 222 and 252, the process can be thermally powered by relatively low grade heat through the Stirling cycle. In this case, the floating pistons 230 and 260 would be hollow structures with substantially the shape shown in order to insulate the second spaces from the water below diaphragms 231 and 261.

In operation of apparatus 200, the second pressure is defined by the feed compressor 202. Product oxygen will be delivered at that pressure, less frictional pressure drops in conduits, the adsorbent bed flow path, and valves 211 and 225. Exhaust oxygen-depleted air is delivered at ambient pressure. However, the first pressure of the cycle may be considerably subambient, as this system operates in a vacuum pressure swing cycle. The inertia of the primary liquid column 280 serves to carry the system through the vacuum swing in each working space alternatingly.

Operation of the process may be controlled completely by the timing of feed supply valves 211 and 213 All other valves are passive non-return valves. The extreme simplicity of this apparatus and process may be noted.

FIG. 5

Apparatus 300 is shown with a single working space 305, coupled to the first end 309 of a primary liquid column 310 in pipe 311. The second end 312 of liquid column 310 is in a vertical portion 314 of pipe 311. The second end 312 of the liquid column may terminate in a free surface, or may be isolated from gas contact by a flexible diaphragm. With a cross-sectional area A of pipe portion 314 at the surface of the liquid column at its second end, gravitational potential energy is stored in the amount $$\rho g A z$$

for liquid density $\rho$ and an upward vertical movement z of the liquid column second end 312.

The top end 315 of pipe portion 314 may be either open or closed to the atmosphere. A valve 316 is shown to indicate the option of the space being closed with a defined quantity of gas therein, and valve 316 is then closed so that chamber 318 in the top end 315 of pipe portion 314 acts as a gas spring. Assuming that the chamber 318 contains N moles of gas in an initial volume $V_o$ with valve 316 closed, and in the approximation of isothermal gas compression, the compression potential energy associated with an upward vertical movement $\Delta z$ the liquid column second end 312 is $$N R T \log_e\{V_o/[V_o - A\Delta Z]\}$$

Similar expressions apply to changes of gravitational and compression potential energy for the working space 305, with $V_o$ defined to be the free gas volume of the working space plus an allowance for adsorbent uptake, and a summation for gravitational potential energy in different volume displacement chambers of the working space. The mean gas volumes, mean working pressures, and liquid surface areas A of the working space 305 and the chamber 318 will be adjusted so that the potential energy stored in the working space at the higher second pressure is approximately equal to the potential energy stored at the second end 312 of the primary liquid column 310 when the pressure in the working space is the lower first pressure.

The kinetic energy stored in the primary liquid column 310 of area A and length L is $$\tfrac{1}{2}\rho A L \dot{Z}^2$$

Under the desirable condition of operation at the resonant natural frequency, the kinetic energy carried in the liquid column at maximum liquid flow velocity will be approximately equal to the potential energy stored when the working pressure in the working space is either the first or second pressure. By matching the liquid displacements and velocity (within approximately sinusoidal liquid oscillations) under the condition of continuity for incompressible liquid, the natural frequency and consistent design parameters are established.

The above discussion shows how a single working space of the invention may be operated at the first end of a primary liquid column, with potential energy stored at the second end of the liquid column. This approach may be applied to many working space configurations, such as described for example with respect to FIGS. 1 and 2. A particular configuration of the working space will now be described for an air separation process, which has the capability to deliver high concentration nitrogen as well as oxygen. This process could also be conducted with two working spaces, coupled to opposite ends of a primary liquid column as shown in FIG. 1.

Working space 305 has three flow path ends branching from an intermediate node 320. One flow path branch passes from node 320 through first adsorbent bed 325 to first flow path end 326, which is connected by feed supply valve 328 to feed supply compressor 330, and by non-return valve 332 to a first volume displacement chamber 334. First volume displacement chamber 332 also communicates to an exhaust non-return valve 336. A second flow path branch passes from node 320 through intermediate adsorbent bed 340 to intermediate flow path end 342, which communicates to an intermediate volume displacement chamber 344 and to a first product delivery valve 346. A third flow path branch passes from node 320 through second adsorbent bed 350 and thence through conduit 351 to second flow path end 352, which communicates by conduit 353 to a second volume displacement chamber 354, and to a second product delivery non-return valve 356. The swept volumes of the volume displacement chambers 334, 344 and 354 may be approximately equal.

The second volume displacement chamber 354 is coupled in cylinder 359 to the first end 309 of primary liquid column 310 by diaphragm 360, whose geometry is defined by piston float 361. The intermediate volume displacement chamber 344 is coupled by diaphragm 363 with piston float 364 to the end 365 of a first secondary liquid column 366 in pipe 367 extending from the first end 309 of primary liquid column 310.

Since the first volume displacement chamber 334 is isolated from the working space by non-return valve 332 which prevents back flow into adsorbent bed 325, no diaphragm is necessary to separate gas in chamber 334 from liquid. Hence first volume displacement chamber 334 is coupled by liquid free surface 375 to the end 378 of a second secondary liquid column 380 in pipe 381 communicating to first end 309 of the primary liquid column 310. Liquid column 380 may be coupled directly to first end 309 to primary liquid column 310, rather than indirectly through liquid column 366 as shown, so that the phase of volume changes in chambers 334 and 344 may be similar. The phase of volume changes in both chambers 334 and 344 will lag the phase of volume changes in chamber 354.

Feed air is introduced to working space 305 through feed supply valve 328 when the working pressure is elevated above ambient. First adsorbent bed 325 serves as a dessicant dryer bed, so that gas reaching the node 320 is dry. Water vapour trapped at elevated pressure in bed 325 is released to gas flowing toward the first flow path end and through non-return valve 332 into first chamber 334 at low pressure, and is expelled with a fraction of exhaust air from valve 336. The apparatus is adjusted so that gas in adsorbent bed 340 also flows toward the intermediate flow path end 342 at the lower first pressure, so that adsorbent bed 340 (of nitrogen selective zeolite such as 10X) serves to concentrate nitrogen, which is delivered preferably at approximately ambient pressure (the first pressure) when valve 346 is opened. Gas in adsorbent bed 350 (also charged with nitrogen selective zeolite) flows toward second flow path end 352 when the pressure is the higher second pressure, so that concentrated oxygen is withdrawn through valve 356.

This apparatus is capable of delivering high purity nitrogen, or 95% purity oxygen (with argon impurity), or both simultaneously, starting from humid ambient air. Energy to power the process is provided as compression energy of feed air, since air exhausted from valve 336 and the product nitrogen from valve 346 are withdrawn at lower pressure. Optionally, a heat exchanger may be provided in conduit 351 to maintain the second end of the flow path at a relatively elevated temperature, so that the process is in part thermally powered by low grade heat. In that case, a thermal insulation jacket and a modified piston float for the second volume displacement chamber would be provided as described for FIG. 4, so as to minimize heat leakage losses.

FIG. 6

Figure 6:
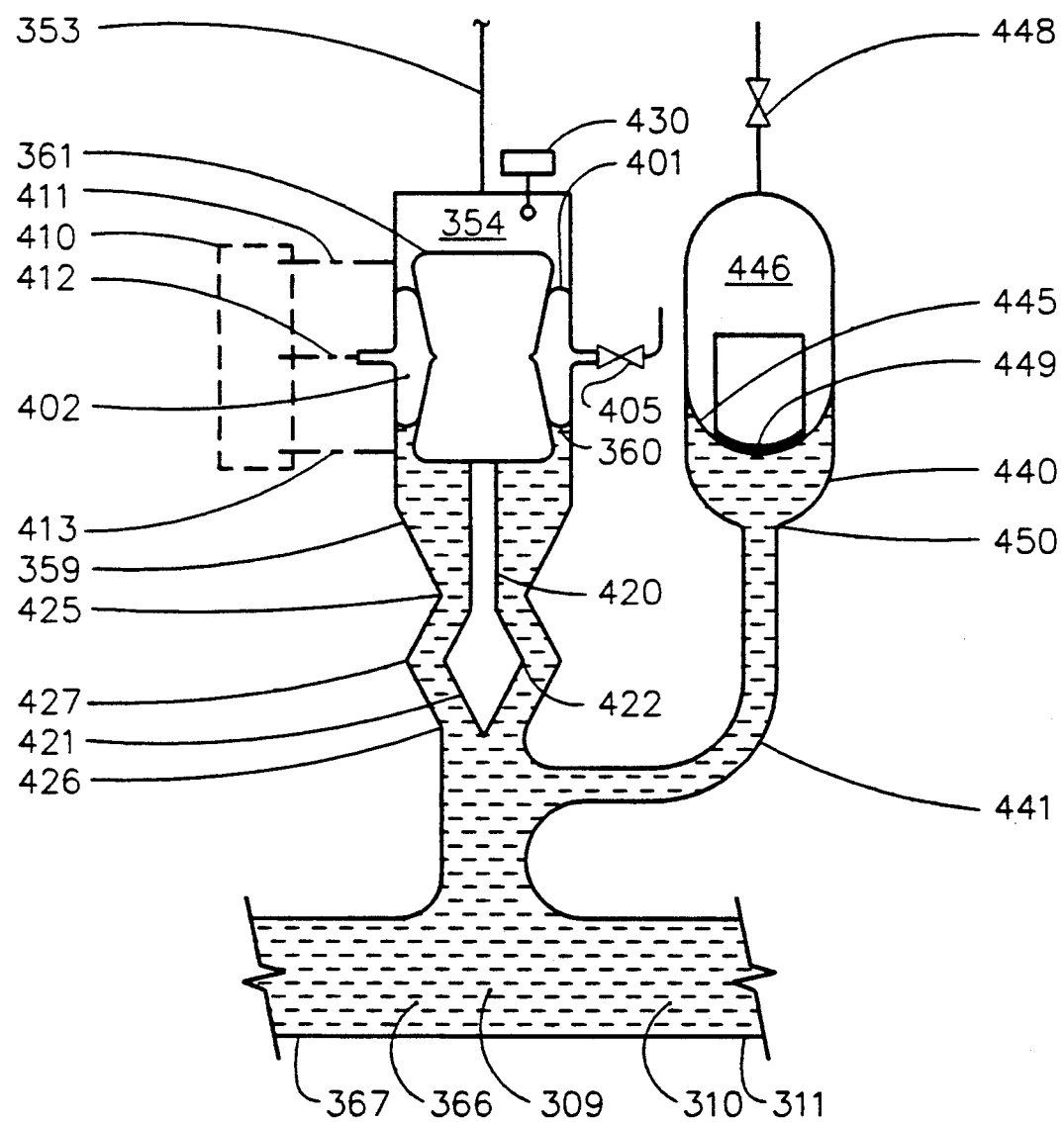
FIG. 6 shows modifications to the apparatus of FIG. 5, for alleviating excessive liquid oscillations.

Using the second cyclic volume displacement chamber 354 in cylinder 359 of embodiment 300 as an example, several auxiliary safety features are shown for preventing damage from excessive amplitudes of oscillation, and for detecting diaphragm failures. FIG. 6 shows cylinder 359 at first end 309 of the primary liquid column 310, a portion of pipe 311, a portion of pipe 367 containing secondary liquid column 366, and a portion of conduit 353 leading to second flow path end 352.

Figure 5:
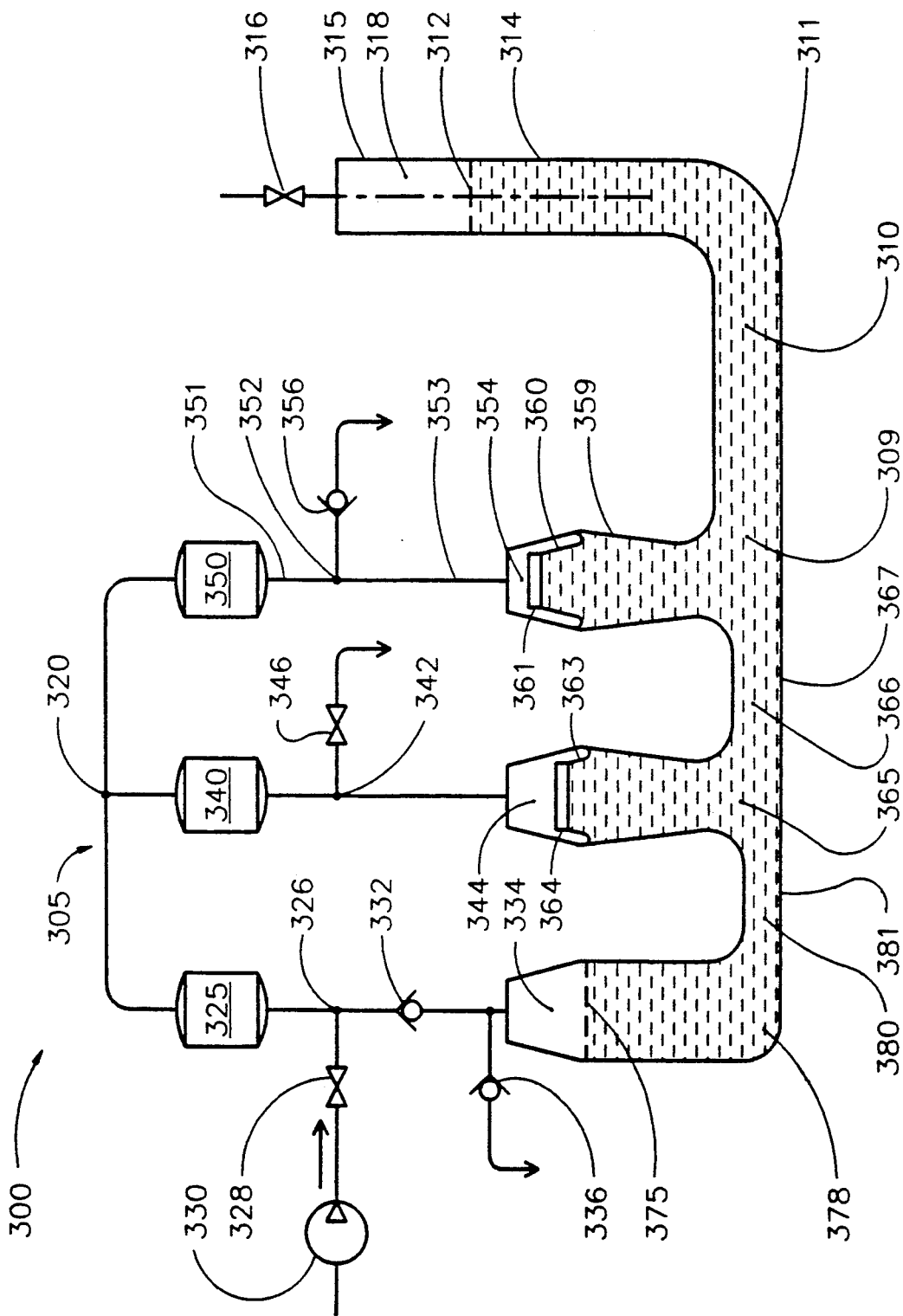
FIG. 5 shows an air separation apparatus capable of purifying nitrogen and concentrating oxygen.

Piston float 361 is given a more complex geometry than shown in FIG. 5, to support diaphragm 360 separating the liquid from gas, and a second diaphragm 40 enclosing a toroidal gas space 402 between diaphragms 360 and 401. Gas space 402 is pressurized through charging valve 405 to maintain an excess pressure at all times above the working pressure in chamber 354, and likewise above the liquid immediately in contact with diaphragm 360. Thus, both diaphragms 360 and 401 are positively pressurized in tension at all times to avoid deflection reversals. Each diaphragm is shown supported on a conically tapered section of piston float 361, to reduce flexing fatigue. A differential pressure sensing monitor 410 senses the pressure differences between the working pressure in chamber 354 through sensing line 411, the pressure in gas space 402 through sensing line 412 and the pressure in the liquid adjacent to diaphragm 360 through sensing line 413.

The differential pressure sensing monitor 410 is used to adjust the gas precharge in gas space 402 provided through charging valve 405, and also to provide an alarm of a failure of either diaphragm 360 or 401 which will be indicated by loss of pressure differences maintained by intact diaphragms. This diaphragm configuration may be described as internally pressurized diaphragm means.

Piston 361 is also shown with a downward extending shaft 420 supporting a deceleration valve spindle 42 with an outer shoulder 422 whose diameter is greater than that of shaft 420. Cylinder 359 is provided with an upper shoulder 425 and a lower shoulder 426 with a contracted inner diameter relative to the rest of cylinder 359, while the inner diameter of shoulders 425 and 426 is similar to the outer diameter of shoulder 422 of valve spindle 421. The shoulders are positioned vertically so that deceleration valve spindle 421 progressively engages with upper shoulder 425 to throttle flow in the annular gap between spindle 421 and shoulder 425 as the piston float 361 approaches its uppermost stroke limit, so that excessive upward motion of the piston float is cushioned and excessive deflection of the diaphragms is avoided. Similarly, the lower shoulder 426 is positioned vertically so that spindle 421 progressively engages with lower shoulder 426 to throttle flow in the annular gap between spindle 421 and shoulder 426, so that excessive downward motion of the piston float is cushioned and excessive deflection of the diaphragms is again avoided. The portion 427 of cylinder 359 between shoulders 425 and 426 has a much larger diameter than outer shoulder 422 of spindle 421, thus providing a generous flow passage to minimize flow friction losses when the piston float 361 is oscillating away from its extreme stroke positions. The vertical movement of piston float 361 is detected by a position sensor 430, so that adjustments to liquid level or other control variables can be made as necessary if the piston float is oscillating with the wrong amplitude or is vertically uncentered.

Finally, a surge absorber 440 may be provided to relieve high inertia flows arrested by deceleration valve spindle 421 throttling against either the upper or lower shoulders 425 or 426. Surge absorber 440 communicates by a short liquid conduit 441 to the first end 309 of the liquid column 310, and includes a gas precharged bladder 445 enclosing a gas space 446 within surge absorber vessel 440. A charging valve 448 enables adjustment of the gas charge within gas space 446. A poppet 449 seats on the entrance 450 of conduit 441 when the liquid pressure at the first end 309 of liquid column 310 drops and liquid is exhausted from surge adsorber vessel 440, to protect bladder 445 from damage.

FIG. 7

The above described embodiments have used secondary oscillating liquid columns to establish the necessary phase differences between volume displacement chambers of a single working space, whose total volume changes and consequent pressure changes are established by a resonantly oscillating primary liquid column. Embodiment 500 of the invention shows use of a reciprocating displacer piston, separate from the oscillating liquid column which establishes pressure changes in the working space, to establish phase differences between volume displacement chambers of a working space and thus to establish flow in the flow path through the adsorbent bed.

Apparatus 500 includes a first working space 501 and a second working space 502, which operate 180° out of phase.

The first working space 501 includes an adsorbent bed 505 with a first end 506 and a second end 507, the adsorbent bed providing a flow path between its first and second ends. The second end 507 of the adsorbent bed communicates through an optional heat exchanger 508 to a second volume displacement chamber 510 and a second product delivery valve 512. The first end 506 of the adsorbent bed communicates to a liquid displacement chamber 515, in turn communicating by conduit 516 to displacer chamber 520. The combined volumes of chambers 515 and 520 is effectively a first volume displacement chamber for the first working space. The second volume displacement chamber 510 and displacer chamber 520 are in opposite ends of a displacer cylinder 521, and are separated by a displacer piston 522 reciprocating in cylinder 521 and sealed therefrom by piston seal 523. The displacer piston 522 is reciprocated by displacer drive means, here shown as a piston rod 526 attached to displacer piston 521 and extending from displacer chamber 520 through rod seal 526 to a linear actuator 528. The volume of liquid displacement chamber 510 is changed by liquid rising and falling in cylinder 530, this liquid being the first end 531 of primary oscillating liquid column 532 in pipe 533 extending from cylinder 530.

The second working space 502 includes an adsorbent bed 535 with a first end 536 and a second end 537, the adsorbent bed providing a flow path between its first and second ends. The second end 537 of the adsorbent bed communicates through an optional heat exchanger 538 to a second volume displacement chamber 540 and a second product delivery valve 542. The first end 536 of the adsorbent bed communicates to a liquid displacement chamber 545, in turn communicating by conduit 546 to displacer chamber 550. The combined volumes of chambers 545 and 550 is effectively a first volume displacement chamber for the second working space. The second volume displacement chamber 540 and displacer chamber 551 are in opposite ends of a displacer cylinder 551, and are separated by a displacer piston 552 reciprocating in cylinder 551 and sealed therefrom by piston seal 553. The displacer piston 552 is reciprocated by displacer drive means, here shown as an extension of piston rod 525 attached to displacer piston 552 and extending from displacer chamber 550 through rod seal 556 to the linear actuator 528 driving both displacer pistons 521 and 551. The volume of liquid displacement chamber 545 is changed by liquid rising and falling in cylinder 560, this liquid being the second end 561 of primary oscillating liquid column 532 in pipe 533 extending from cylinder 530 to cylinder 560.

The pressure difference across each of displacer pistons 522 and 552 is small, being just the frictional pressure drop in each adsorbent bed flow path. Hence, the power required of displacer drive means 528 is small, and may be zero since the pressure difference between the first working space 501 and the second working space 502 acting on the cross sectional area of piston rod 525 is in the correct sense to drive the displacer pistons to generate flow in each flow path toward the first end when the pressure is the first pressure, and toward the second end when the pressure is the second pressure. When the pressure is high in the first working space because the liquid level is high in cylinder 530, and the pressure is then low in the second working space with the liquid level low in cylinder 560, displacer piston 522 moves to expand chamber 510 while displacer piston 552 contracts chamber 540. Displacer actuator may then be eliminated, or retained as a phasing control mechanism.

If optional heat exchangers 508 and 538 are provided, and are used to heat the second chambers 510 and 540 and the second ends 507 and 537 of the adsorbent beds, a cooling jacket 565 may be provided to cool pipe 533, with cooling water or air provided by conduit 566 and removed by conduit 567.

A shut-off valve 570 in pipe 533 may be used to stop the movement of liquid column 532 at the extremes of its oscillation, so that the interval of maximum (second) pressure in one working space and minimum (first) pressure in the other working space may be extended as long as shut-off valve 570 is held closed. Closure of valve 570 is effected by rotating ball 571 90° in valve housing 572, from the fully open position shown. While valve 570 is closed, potential energy is stored in the apparatus as compression energy and gravitational energy due to the higher elevation of liquid in one working space. When valve 570 is rapidly opened from its closed position to its fully open position, the potential energy stored in one working space is released to accelerate the liquid column 523 which then stores potential energy in the other working space. Thus, the potential energy stored in one working space is exchanged to kinetic energy of the liquid column and then to potential energy in the other working space. The liquid column is then allowed to oscillate one half cycle at a time, taking one half its resonant period to achieve the potential energy transfer from one working space to the other. The use of inertia in the liquid column to store kinetic energy enables substantially complete exchange of potential energy between the working spaces, so that expansion energy normally dissipated in pressure swing adsorption gas separation processes is here recovered to a high degree. The use of shut-off valve 570 is only justified when the process cycle period must be extended beyond the natural resonant period of the liquid column between the working spaces.

With the addition of feed supply means and a second product removal means, embodiment 500 as described above may be applied to diverse gas separation applications. In further generalizations, multiple adsorbent beds may be provided in the flow path of each working space, as described for FIG. 1 above and in my copending U.S. patent application 07/557,132. As described in that related application, stepped displacer pistons communicating with multiple adsorbent beds in a flow path may be useful for separation with high recovery of trace components from a carrier gas.

In the particular embodiment 500, the first component may be dissolved or condensed into the liquid of the liquid column 532. Thus, diaphragms separating the liquid in cylinder 530 and 560 from first displacement chambers 515 and 545, which would be required in many applications of the apparatus 500 as described to this point, are not included in the examples to be described, so that the free surface of the liquid is in contact with the gas in the liquid displacement chambers. Extended surfaces 580 are provided in the liquid displacement chambers 515 and 545 to increase the area of contact between gas or vapour in the chambers and the liquid. The extended surfaces 580 are formed of a wettable solid material, and may be parallel plates, tubes, or a packing through which the liquid free surfaces 582 oscillate up and down.

The feed supply means is shown as compressor 585 delivering the feed gas mixture through feed supply valve 587 to the first chamber 515 of the first working space, and through feed supply valve 589 to the first chamber 545 of the second working space. The feed gas mixture includes the strongly adsorbed first component which may be dissolved or condensed into the liquid, and a relatively inert carrier gas such as air which is the second component. The purified second component is delivered from second product delivery valves 512 and 542.

Since the first component is dissolved or condensed into the liquid, the first product delivery means will deliver liquid containing the first component. For the first working space, the first product delivery means includes a liquid level sensor 590, which controls a liquid delivery valve 591 to discharge liquid containing the first component from cylinder 530. For the second working space, liquid level sensor 593 controls liquid delivery valve 594 to discharge liquid containing the first component from cylinder 560. Liquid supply valve 596 is used to supply liquid to the first end 531 of pipe 533, and liquid supply valve 598 is used to supply liquid to the second end 561 of pipe 533. The liquid level sensors 590 and 593 serve to regulate the liquid level in the cylinders 530 and 560 by controlling the discharge of excess liquid through valves 591 and 594.

EXAMPLE NO. 2

The first component in the feed gas may be a gas readily or usefully dissolved in a suitable liquid, in which the second component is relatively insoluble. An important application is ozonation of water, in which ozone delivered form a coronoa discharge apparatus at about 1% concentration in oxygen is to be dissolved in water for disinfection and destruction of organic pollutants. While ozone is about ten times as soluble in water as oxygen, the large excess of less soluble gas makes it difficult to dissolve a substantial fraction of the ozone without bulky and energy-intensive water containing and mixing devices. Thus, ozone generation systems are frequently operated at the highest possible ozone exit concentration to facilitate water contacting, but the productivity and energy efficiency of corona discharge ozone generators is greatly degraded at higher ozone concentration. It is thus highly desirable to operate the ozone generator at low ozone concentration (about 1% $O_3$) to optimize its efficiency, while separating the ozone/oxygen mixture downstream to achieve higher ozone concentration for water contacting, while recycling the oxygen to the ozone generator to reduce oxygen consumption.

For this applications, embodiment 500 is used not only to concentrate the ozone, but also to dissolve the ozone into water used as the displacement liquid; so that all the ozone is dissolved into a high concentration ozonated water stream as the first product; and no ozone leaves the apparatus in the gas phase at dangerous concentrations.

In the ozone application, the apparatus must use an adsorbent in beds 505 and 535 which has minimal effect to catalyze ozone decomposition, and which is not deactivated by contact at the second end of the beds with saturated water vapour. Silica gel is known to be a useful adsorbent for ozone separation. Silicalite (a low alumina pentasil zeolite which is hydrophobic) may offer superior properties in working with high water vapour concentrations. Operation of the apparatus at cool ambient or moderately refrigerated temperatures is desirable to improve ozone solubility in water and uptake on adsorbents, while reducing water vapour pressure.

The feed gas with ozone as the first component and oxygen as the majority second component is introduced through feed supply valves 587 and 589. Purified oxygen is delivered from second product valves 5412 and 542, for recyle to the ozone generator. Feed water is introduced through valves 596 and 598, and ozonated water is delivered through valves 591 and 594 as the first product. This ozonated water stream may be highly concentrated, to the order of 15 mg/L $O_3$, and may be externally injected and mixed into a larger water stream to achieve typical potable water ozonation concentrations of about 1 mg/1 $O_3$. Ozone concentrations reached within the chambers 515 and 545 will be limited by the rate of ozone dissolution into water, balanced by the feed flow rate approximately equal to the oxygen delivery rate.

EXAMPLE NO. 3

The first component in the feed gas may be a vapour, such as a hydrocarbon or solvent vapour, carried in air as the second component. An important application is recovery of gasoline vapour mixed in air displaced from tanks during vehicles refueling operations or tanker transfer at terminals. Venting of gasoline and other hydrocarbon vapours to the atmosphere is an important source of urban smog pollution, as well as a major economic loss.

The apparatus 500 purifies the air which may be released to the environment from valves 512 and 542, while the vapour is concentrated in the first chambers 515 and 545 and is condensed therein. The condensed first component joins the liquid, and is delivered as a liquid first product by valves 591 and 594. Heat of condensation is removed by cooling jacket 565 (which may be disposed alternatively and more effectively with direct heat exchange to extended surfaces 580), and in part by removal of the first product.

The adsorbent in beds 505 and 535 must be selected to remain active with high concentrations of the first component vapour, and maybe assisted in this regard by operating the adsorbent bed at a moderately elevated temperature established by heat exchangers 508 and 6538, or by cooling the liquid column 532 to a temperature below ambient. Heat provided at the second end of the adsorbent beds will assist powering the apparatus through the Stirling cycle, while of course increasing the cooling load at the first end of the adsorbent beds.

FIGS. 8 AND 9

Above described embodiments have shown two working spaces operating 180° out of phase, or one working space operating 180° out of phase with a potential energy storage means other than a second similar working space, in either case coupling with a single primary liquid column as the kinetic energy storage means through which potential energy can be exchanged.

Instead of using one primary liquid column to exchange kinetic energy for the potential energy of the working space, it is also possible to have multiple liquid columns coupled to a single working space, and oscillating in different phases, to combine the functions of (1) exchange of kinetic for potential energy external to the working space, and (2) achieving a phase shift between volume changes in volume displacement chambers along the flow path, so as to generate flow in the flow path directed toward the first end at the first pressure and toward the second end at the second pressure. The multiple liquid columns may be coupled to multiple working spaces in order to achieve a satisfactory balance of potential and kinetic energy, and smoothed external flows and power demand. In particular, a number of identical working spaces may be coupled together by an equal number of identical liquid columns, each liquid column coupled at one end to the first volume displacement chamber of a working space and coupled at the other end to the second volume displacement chamber of an adjacent working space, so that the operating phases of adjacent working spaces are equally separated by a phase angle of 360+ divided by the number of working spaces. The following embodiment has three identical working spaces cooperating as described with three identical liquid columns, so that the operating phases of the working spaces are equally separated by a phase angle of 120°.

Figure 8:
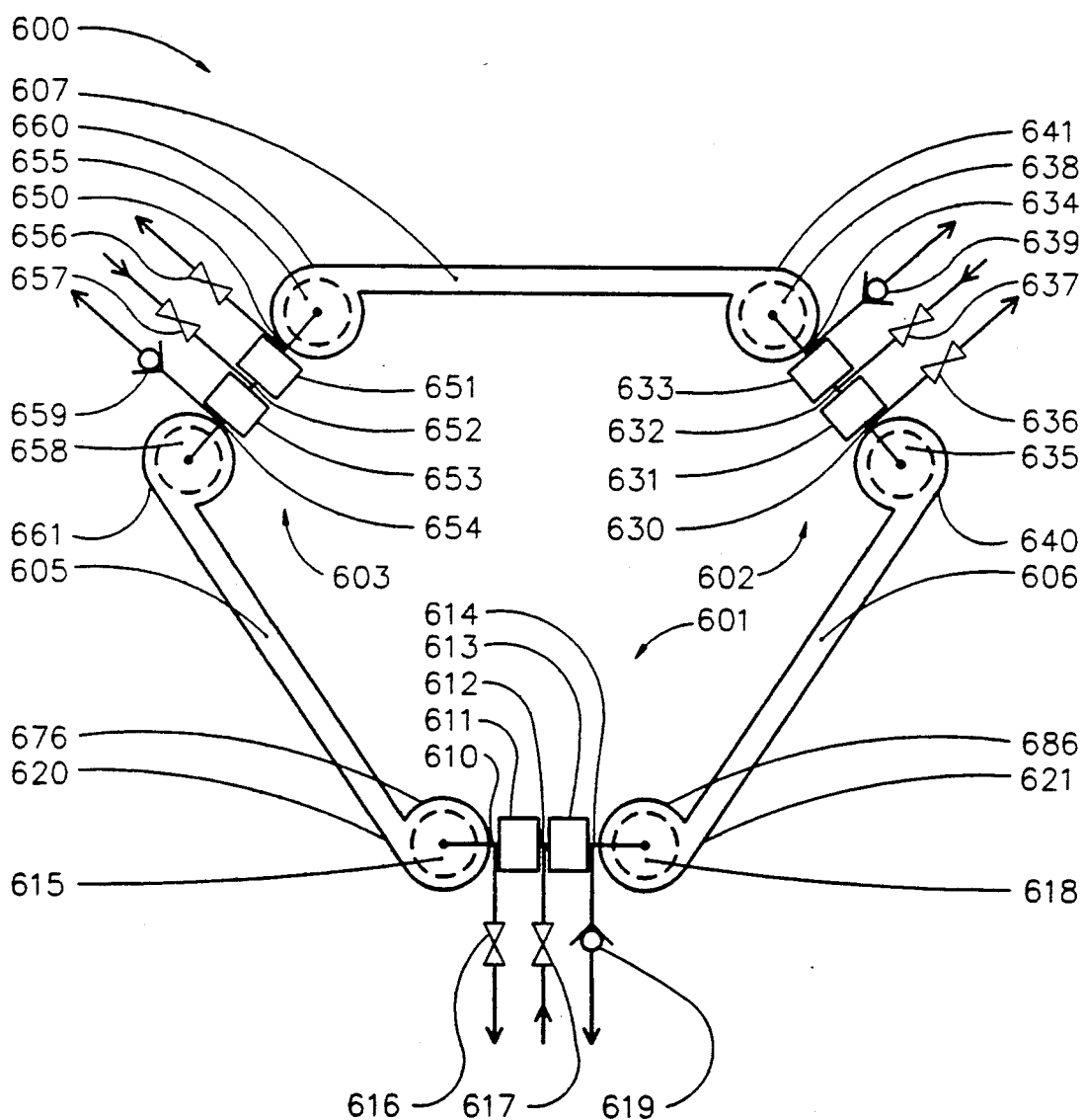
FIG. 8 shows an apparatus with three working spaces coupled by three liquid columns in plan view.
Figure 9:
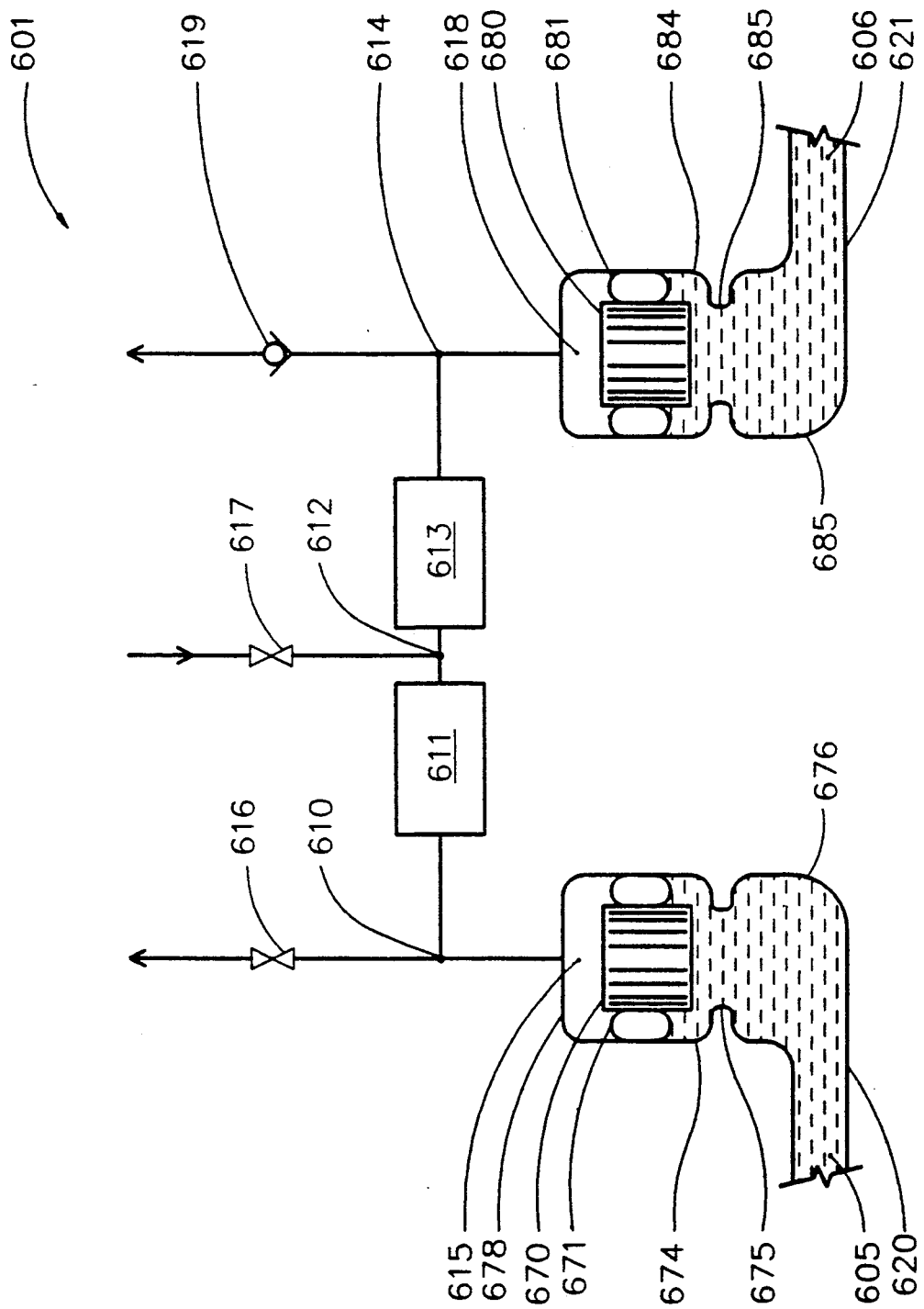
FIG. 9 is an elevation view of one working space from FIG. 8.

Embodiment 600 is shown in plan view in FIG. 8, and in a partial elevation view in FIG. 9. As shown in FIG. 8, embodiment 600 has three identical working spaces 601, 602 and 603, and three oscillating liquid columns 605, 606 and 607. FIG. 9 is a plan view of working space 601 in isolation.

The first working space 601 has a flow path extending from first end 610 through adsorbent bed 611 to an intermediate node 612, and thence through adsorbent bed 613 to second flow path end 614. First end 610 communicates with a first volume displacement chamber 615 and a first product delivery valve 616. The intermediate node 612 communicates with feed supply valve 617, which receives feed gas mixture compressed to approximately the second pressure from a feed supply means. Second end 614 communicates with a second volume displacement chamber 618 and a second product delivery valve 619. The first volume displacement chamber 615 is coupled to first end 620 of liquid column 6054, while the second volume displacement chamber 618 is coupled to the second end 621 of liquid column 606.

Similarly second working space 602 has a flow path extending from first end 630 through adsorbent bed 631 to an intermediate node 632, and thence through adsorbent bed 633 to second flow path end 634. First end 630 communicates with a first volume displacement chamber 635 and a first product delivery valve 636. The intermediate node 6321 communicates with feed supply valve 637, which receives feed gas mixture compressed to approximately the second pressure from a feed supply means. Second end 634 communicates with a second volume displacement chamber 638 and a second product delivery valve 639. The first volume displacement chamber 635 is coupled to first end 640 of liquid column 606, while the second volume displacement chamber 638 is coupled to the second end 641 of liquid column 607.

Likewise third working space 603 has a flow path extending from first end 650 through adsorbent bed 651 to an intermediate node 652, and thence through adsorbent bed 653 to second flow path end 654. First end 650 communicates with a first volume displacement chamber 655 and a first product delivery valve 656. The intermediate node 652 communicates with feed supply valve 657, which receives feed gas mixture compressed to approximately the second pressure from a feed supply means. Second end 654 communicates with a second volume displacement chamber 658 and a second product delivery valve 659. The first volume displacement chamber 655 is coupled to first end 660 of liquid column 607, while the second volume displacement chamber 658 is coupled to the second end 661 of liquid column 605.

By symmetry, the process is conducted identically in the three working spaces but phased 120° apart, while volume changes at the first and second ends of each liquid column are equal in displacement but phased 180° apart. Hence in each working space the first and second volume displacement chambers will have equal swept volume, while the volume changes in the second chamber will have a leading phase by 60° relative to volume changes in the first chamber. With the liquid columns oscillating 120° apart, the working pressure in the working spaces will cycle between a lower first pressure and a higher second pressure, with the flow in the flow path directed toward the first end of each flow path at the first pressure and toward the second end of the flow path at the second pressure. Hence a less readily adsorbed first component will be separated into the first product withdrawn by the first product delivery valves, and a more readily adsorbed second component will be separated into the second product withdrawn by the second product delivery valves.

The process is started and operated by operating the feed supply and first product delivery valves to be opened for brief intervals in a sequence such as 617-656-637-616-657-636, so that the first, second and third working spaces are operated and energized in the order given. In the particular valve logic described, the three second product delivery valves are self-operating non-return valves. When the pressure in a working space reaches the second pressure, the feed supply valve will be opened for an interval to supply feed gas and compression energy to that working space. When the working pressure in the working space reaches the first pressure, the first product delivery valve will be opened for an interval to withdraw first product gas. The operating pressure of the valves may be adjusted with respect to the first and second pressures, and the valve logic may be modified, according to actual energy losses and the feed ratio of first and second components, so that the apparatus functions with high energy efficiency.

As shown in FIG. 9, the volume of first volume displacement chamber 615 is varied by a piston float 670 sealed from the liquid by double diaphragm 671 in cylinder 674. The liquid enters the cylinder 674 vertically through port 675 from swirl chamber 676. As seen in the plan view of FIG. 8, swirl chamber 676 is configured as a volute with tangential entry from the first end 620 of liquid column 605. It will be noted that port 675 provides a lower stop to limit the downward travel of piston float 670, while supporting double diaphragm 671. The top 678 of cylinder 674 likewise provides an upper stop to limit the upward travel of piston float 670, while supporting double diaphragm 671. Thus, double diaphragm 671 is protected from damage at either limit of piston float 670 stroke.

Similarly, the volume of second volume displacement chamber 618 is varied by a piston float 680 sealed from the liquid by double diaphragm 681 in cylinder 684. The liquid enters the cylinder 684 vertically through port 685 from swirl chamber 686. As seen in the plan view of FIG. 8, swirl chamber 686 is configured as a volute with tangential entry from the second end 621 of liquid column 606.

It will be understood that the different aspects of the present invention may be expressed with much diversity and in many further combinations than the specific examples described above, under the scope of the following claims.

I claim:

1. A process for separating first and second components of a gas mixture to produce a product enriched in one of the first or second components, the first component being more readily adsorbed under increase of pressure relative to the second component which is less readily adsorbed under increase of pressure over an adsorbent, such that a gas mixture of the first and second components contacting the adsorbent is relatively enriched in the first component at a first lower pressure and is relatively enriched in the second component at a second higher pressure when the pressure is cycled between the first and second pressures at a cyclic frequency; providing for the process a flow path through an adsorbent bed in a working space; and the process having the cyclically repeated steps at the cyclic frequency and in some sequence of:

(a) introducing the gas mixture to the flow path, (b) generating cyclically oscillating flow of a displacement liquid to change the volume of the working space, thus generating cyclic pressure changes in the working space and alternatingly compressing and expanding the gas in the working space to change the amount of potential energy associated with gas compression and adsorption in the working space, (c) generating cyclically reversing flow of the gas mixture in the flow path, while establishing a relative phase between the reversing flow and the said pressure changes, (d) coordinating he relative phase of the said pressure changes within the working space and the reversing flow of the gas mixture in the flow path, so that the gas flow in the flow path is directed toward a first end of the flow path when the pressure is approximately the first lower pressure, and the gas flow in the flow path is oppositely directed toward a second end of the flow path when the pressure is approximately the second higher pressure; so as to achieve a separation of gas enriched in the first component to the first end of the flow path, and gas enriched in the second component to the second end of the flow path, (e) withdrawing the product from the flow path, (f) storing potential energy of compression in the working space when the pressure in the working space is the higher second pressure, (g) storing potential energy when the pressure in the working space is the lower first pressure, (h) storing kinetic energy when the pressure in the working space is changing between the first and second pressures, (i) exchanging energy between the potential energy stored in step (f), the kinetic energy stored in step (h), and the potential energy stored in step (g), and (j) providing driving energy to the process to compensate for energy dissipation effects and nay imbalance of energy storage in steps (f), (g) and (h), and further providing that the potential energy stored in steps (f) and (g) and the kinetic energy stored in step (h) are approximately equal, to within the energy dissipation effects and energy storage imbalances compensated in step (j).

2. The process of claim 1, in which the cyclic frequency is approximately a resonant frequency.

3. The process of claim 1, in which the kinetic energy stored in step (h) is substantially associated with the liquid flow velocity and the inertia of the flowing displacement liquid in step (b).

4. The process of claim 1, further providing for the displacement liquid to have a center of mass elevation which varies with the cyclically oscillating flow of the liquid, such that the center of mass elevation of the displacement liquid is raised in step (g) relative to step (f) so that potential energy is stored in step (g) as gravitational potential energy.

5. The process of claim 1, further providing a second gas space whose volume and pressure are changed by the cyclic oscillations of the displacement liquid in step (b), but in opposite phase to the volume and pressure changes in the working space, so that potential energy is stored in step (g) as compression energy of gas in the second space.

6. The process of claim 5, in which the second gas space is a second working space containing a second adsorbent bed, so that a gas separation process is also performed within the second working space.

7. The process of claim 6, in which the working space and the second working space, and the gas separations performed therein, are substantially identical.

8. The process of claim 1, further introducing a feed gas mixture in step (a) at a relatively higher pressure, and withdrawing a product gas in step (e) at a relatively lower pressure, thus contributing expansion energy within the working space as driving energy to accomplish step (j).

9. The process of claim 1, further maintaining the second end of the flow path at a higher temperature than the first end of the flow path, so that driving energy in step (j) is contributed as thermal energy.

10. The process of claim 1, further providing reversing pump means to control the oscillating flow of displacement liquid in step (b) and thus to contribute toward step (j).

11. The process of claim 1, further providing chambers within the working space, the said chambers including a first chamber communicating with the first end of the flow path and a second chamber communicating with the second end of the flow path; providing displacer means communicating with the first and second chambers so that reciprocation of the displacer means generates opposite and substantially equal volume changes in the first and second chambers; and reciprocating the displacer means at the cyclic frequency to perform steps (c) and (d).

12. The process of claim 11, in which the volume changes of the working space generated by the cyclically oscillating flow of displacement liquid in step (b) are generated in the first chamber.

13. The process of claim 12, in which the displacement liquid directly contacts the gas mixture in the first chamber.

14. The process of claim 13, in which the first component is dissolved in the displacement liquid; and further withdrawing displacement liquid containing the dissolved first component, and replenishing the displacement liquid to replace that withdrawn.

15. The process of claim 14 in which the first component is ozone, and the second component is oxygen enriched air.

16. The process of claim 13, in which the first component is a condensible vapour, and the displacement liquid includes the condensate of the first component; further withdrawing excess displacement liquid as a product of the process.

17. The process of claim 16, in which the first component is a hydrocarbon vapour, and the second component is air.

18. The process of claim 13, in which the displacement liquid has low vapour pressure in the first chamber.

19. The process of claim 12, further providing means to prevent direct contact between the gas in the first chamber and the displacement liquid.

20. The process of claim 1, further providing a first chamber at the first end of the flow path, and a second chamber at the second end of the flow path; further changing the volumes of both the first chamber and the second chamber through the cyclically oscillating flow of liquid generated in step (b) in order to change the pressure of the working space, and with the volume changes in the first chamber having a lagging phase relative to volume changes in the second chamber in order to achieve step (d), said lagging phase being substantially determined by the fluid inertia of liquid interposed between the first and second chambers.

21. The process of claim 20, further providing a plurality of adsorbent beds in the flow path, and providing an intermediate chamber communicating with a node in the flow path between two adjacent adsorbent beds; and changing the volume of the intermediate chamber through the cyclically oscillating flow of displacement liquid generated in step (b), thus contributing to pressure changes in the working space, and with the volume changes in the intermediate chamber having a lagging phase relative to volume changes in the second chamber, and also with volume changes in the first chamber having a lagging phase relative to volume changes in the intermediate chamber, the relative phase of volume changes in the chambers being substantially determined by the fluid inertia of liquid interposed between the chambers.

22. The process of claim 1, in addition to steps (a)–(j) further including the steps of:
   (k) withdrawing from adjacent the first end of the flow path a first product gas enriched in the first component,
   (l) withdrawing from adjacent the second end of the flow path a second product gas enriched in the second component.

23. Apparatus for separating first and second components of a gas mixture, the first component being more readily adsorbed under increase of pressure relative to the second component which is less readily adsorbed under increase of pressure over an adsorbent, such that a gas mixture of the first and second components contacting the adsorbent is relatively enriched in the first component at a first lower pressure and is relatively enriched in the second component at a second higher pressure when the pressure is cycled between the first and second pressures at a cyclic frequency; and the apparatus including a working space containing an adsorbent bed, with a flow path through the adsorbent bed having a first end of the flow path and a second end of the flow path, and means to introduce the gas mixture and means to remove a product from the flow path; the working space further including a first volume displacement chamber communicating with the first end of the flow path, and a second volume displacement chamber communicating with the second end of the flow path, so that changes of the total volume of the working space including the first and second volume displacement chambers will change the pressure in the working space between the first and second pressures and thus will change the compression potential energy in the working space; the apparatus further including:
   (a) a liquid column in a pipe, the liquid column having two ends,
   (b) means to couple one end of the liquid column to the working space, so that displacement of the liquid column in the pipe is coupled to volume changes of the working space and changes of pressure and compression potential energy in the working space,
   (c) second potential energy storage means coupled to the other end of the liquid column, so that potential energy is stored in the second potential energy storage means when the pressure in the working space is the first lower pressure,
   (d) means to generate oscillating displacements of the liquid column at the cyclic frequency,
   (e) means to generate cyclic volume changes of the first and second volume displacement chambers, with means to coordinate cyclic volume changes of the first and second volume displacement chambers, so that the first volume displacement chamber has a lagging phase with respect to volume changes in the second volume displacement chamber; so as to generate flow of the gas mixture in the flow path in a relative phase to changes in pressure within the working space so that the gas flow in the flow path is directed toward the first end of the flow path when the pressure is approximately the first lower pressure, and the gas flow in the flow path is oppositely directed toward the second end of the flow path when the pressure is approximately the second higher pressure; and so as to achieve a separation of gas enriched in the first component toward the first end of the flow path, and gas enriched in the second component toward the second end of the flow path,
   (f) means to store kinetic energy substantially in the fluid mass of the liquid column when the pressure in the working space is changing between the first and second pressures,
   (g) means to exchange energy between the potential energy stored in the working space when its pressure is the second pressure, potential energy stored in the second potential energy means when the pressure in the working space is the first lower pressure, and the kinetic energy stored when the pressure is changing between the first and second pressures, and
   (h) means to provide driving energy to the process to compensate for energy dissipation effects and nay imbalance of energy stored as potential and kinetic energy.

24. The apparatus of claim 23, in which the means to couple one end of the liquid column to the working space includes a flexible diaphragm separating the liquid from gas in a volume displacement chamber.

25. The apparatus of claim 23, in which the means to couple one end of the liquid column to the working space includes a piston float within a cylinder and separating the liquid from gas in a volume displacement chamber.

26. The apparatus of claim 25, in which the piston float is sealed to the cylinder by internally pressurized double diaphragm means.

27. The apparatus of claim 23, in which the means to couple one end of the liquid column to the working space is the free surface of the liquid in direct contact with the gas in the second volume displacement chamber.

28. The apparatus of claim 23, in which the second potential energy storage means is another working space similar to the working space but operated in opposite phase.

29. The apparatus of claim 23, in which the second potential energy storage means is a gas charged chamber communicating to the pipe at the other end of the liquid column from the working space.

30. The apparatus of claim 23, in which the second potential energy storage means is a vertical portion of the liquid column at its other end opposite from the working space, and the pipe and the said vertical portion of the liquid column are means to define a center of mass elevation of the liquid column which varies with the oscillating displacements of the liquid column, so that gravitational potential energy is stored by liquid level differences and by changes in the center of mass elevation of the liquid column.

31. The apparatus of claim 23, in which the liquid column is a primary liquid column coupled to the second volume displacement chamber; and the means to coordinate cyclic volume changes of the first and second volume displacement chambers, with the volume changes in the first volume displacement chamber having a lagging phase with respect to volume changes in the second volume displacement chamber, is provided as a secondary liquid column coupled at opposite ends to the first and second volume displacement chambers, with the said lagging phase established by the fluid inertia of said secondary liquid column.

32. The apparatus of claim 23, in which the liquid column is coupled to the first volume displacement chamber; and the means to coordinate cyclic volume changes of the first and second volume displacement chambers, with the volume changes in the first volume displacement chamber having a lagging phase with respect to volume changes in the second volume displacement chamber, is provided as a displacer piston means to generate opposite volume displacements in the second volume displacement chamber and in a displacer chamber communicating to the first volume displacement chamber, with displacer drive means to reciprocate the displacer piston at the cyclic frequency.

33. The apparatus of claim 23, in which the liquid column is a primary liquid column coupled to the second volume displacement chamber of the working space; and further including in the working space a second adsorbent bedcommunicating to the flow path, and an intermediate volume displacement chamber communicating to the second adsorbent bed; the apparatus further including a secondary liquid column coupled to the second and intermediate volume displacement chambers to that volume displacements in the intermediate volume displacement chamber will have a lagging phase with respect to volume changes in the second volume displacement chamber, and another secondary liquid column coupled to the first and intermediate volume displacement chambers so that volume displacements in the first volume displacement chamber will also have a lagging phase.

34. The apparatus of claim 23, further including a feed supply valve to introduce feed gas mixture to the working space, and a product delivery valve to withdraw a product gas from the working space, and further characterized by:
(a) means to open the feed supply valve at a relatively higher pressure, and to open the product delivery valve at a relatively lower pressure, so as to provide compression energy within the working space as driving energy for the apparatus.

35. The apparatus of claim 23, with means to maintain the temperature of the second end of the flow path and the second volume displacement chamber at a higher temperature relative to the temperature of the first end of the flow path and the first volume displacement chamber, so as to provide thermal energy as driving energy to the apparatus.

36. The apparatus of claim 35, with a liquid column coupled to the first volume displacement chamber, and with a piston float in the first volume displacement chamber insulating the gas in the first volume displacement chamber from the liquid in the said liquid column.

37. The apparatus of claim 23, with flow control means to control oscillating flow of liquid in the liquid column.

38. The apparatus of claim 37, in which the flow control means is a reversible pump.

39. The apparatus of claim 37, in which the flow control means is a throttle valve.

40. The apparatus of claim 23, with a shut-off valve in the pipe, with control means to close the valve so as to stop flow in the pipe during intervals while the pressure in the working space is the first pressure and while the pressure in the working space is the second pressure, so as to hold the stored potential energy during such intervals and thus to extend the cycle period beyond the resonant period of the liquid column in the apparatus, and to open the valve to release the stored potential energy for exchange with kinetic energy of the liquid column while the pressure is changing between the first and second pressures.

41. The apparatus of claim 23, with a number of working spaces similar to the working space, and including a second working space and a third working space cooperating with the working space, each of the second and third working spaces being similar to the first working space, and each working space having a first volume displacement chamber and a second volume displacement chamber communicating with respectively first and second ends of a flow path through an adsorbent bed; and with a number of liquid columns cooperating with the working spaces, the number of liquid columns being equal to the number of working spaces, each liquid column having a first end coupled to the first volume displacement chamber of a working space and a second end coupled to the second volume displacement chamber of another working space; and with valve control means to control the opening of a feed supply valve and a product delivery valve for each working space, such that the operating phases of the working spaces are separated by an equal phase angle of 360° divided by the number of working spaces.

42. The apparatus of claim 41, in which the number of working spaces is three and the number of liquid columns is three, so that the operating phases of the working spaces are equally separated by a phase angle of 120°.

* * * * *